Figure 1:
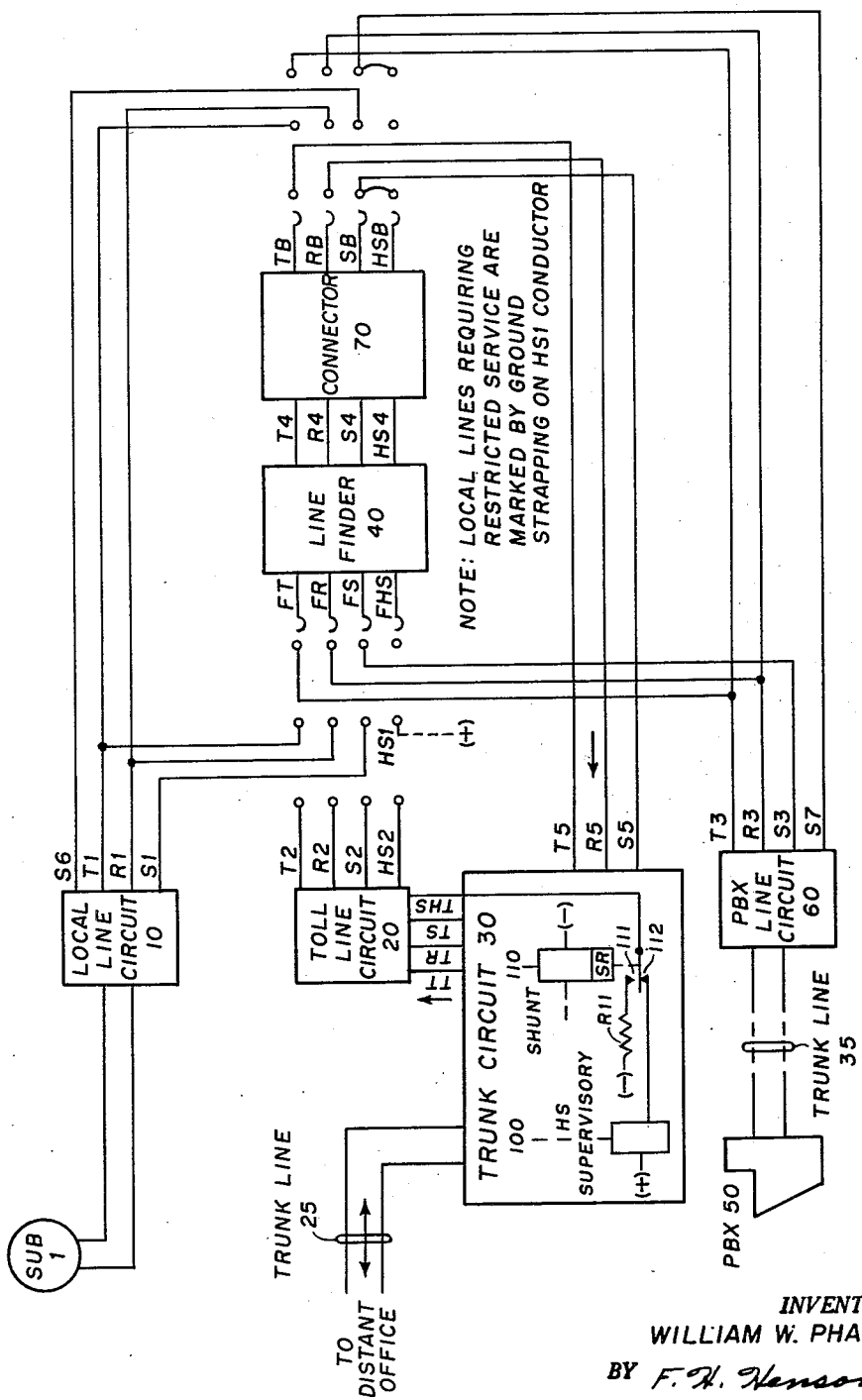
Figure 2:
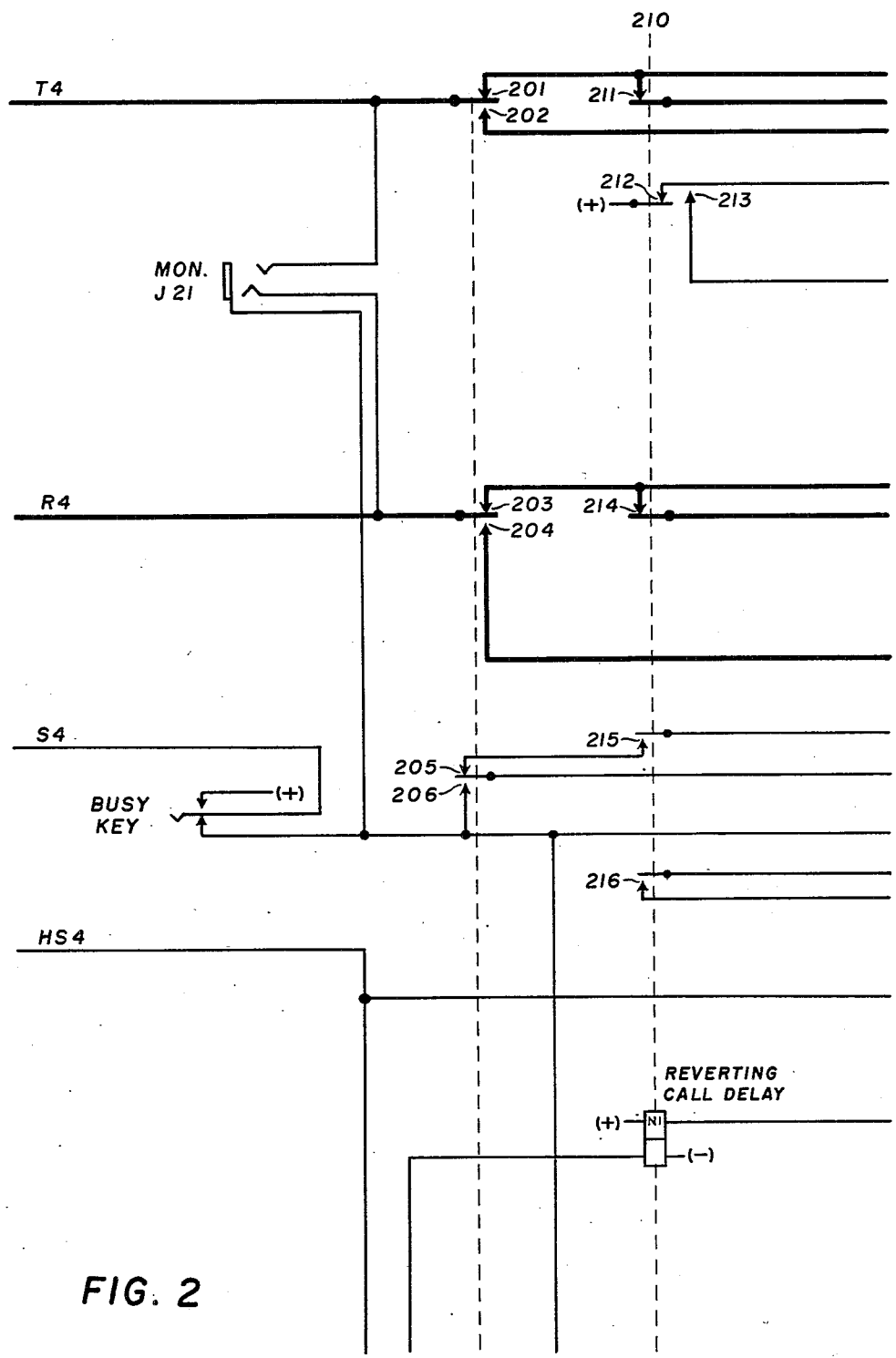
Figure 3:
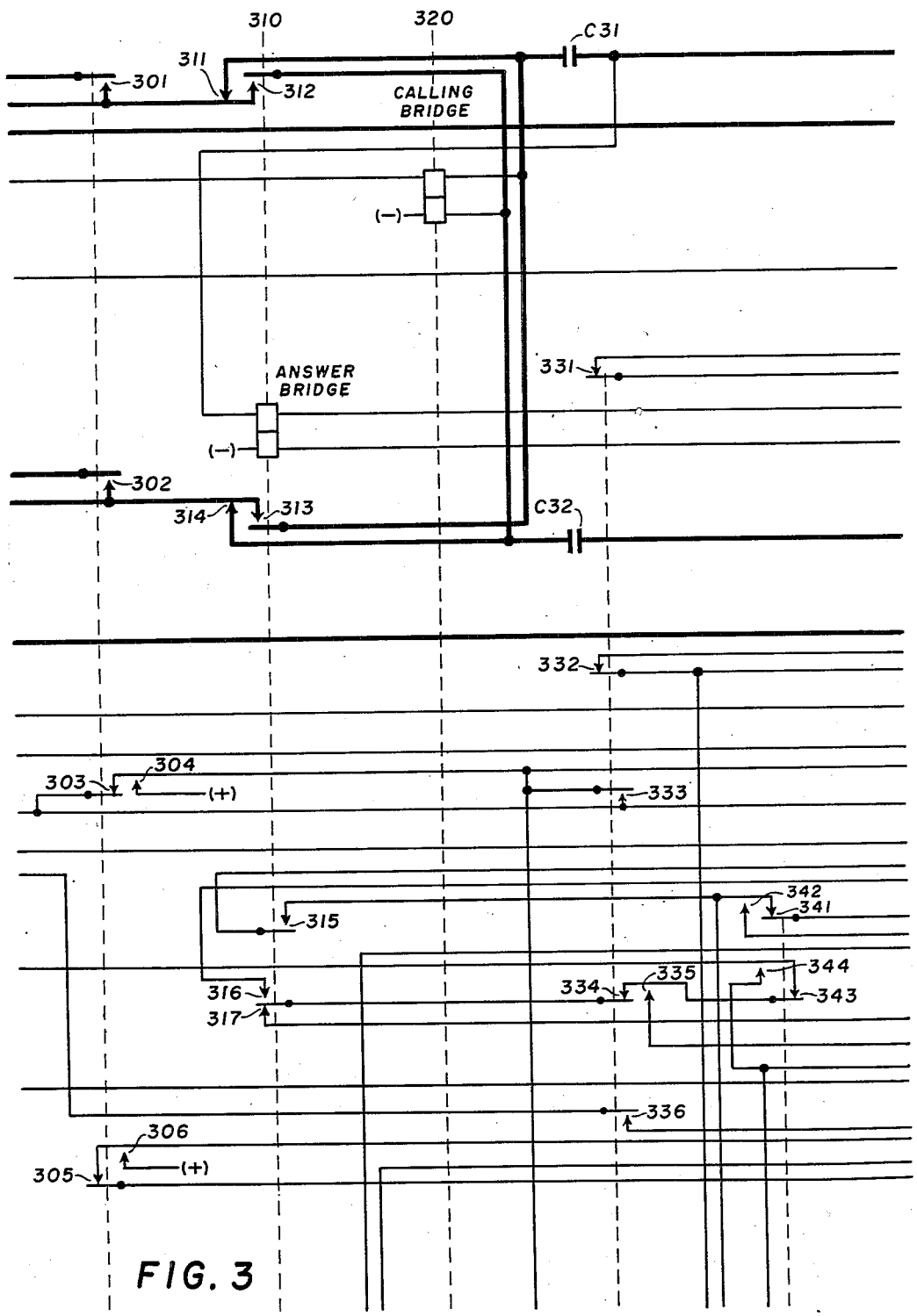
Figure 4:
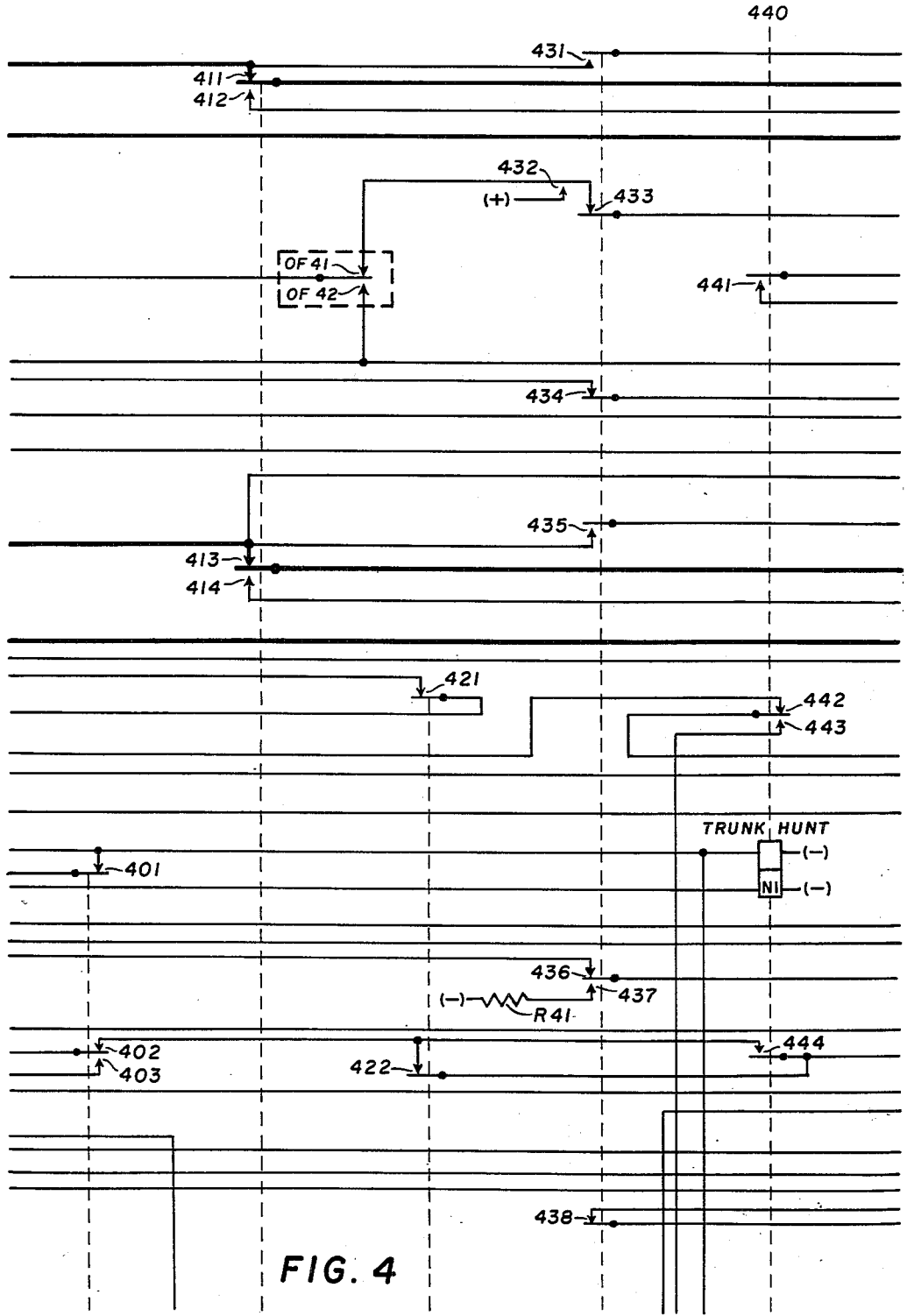
Figure 5:
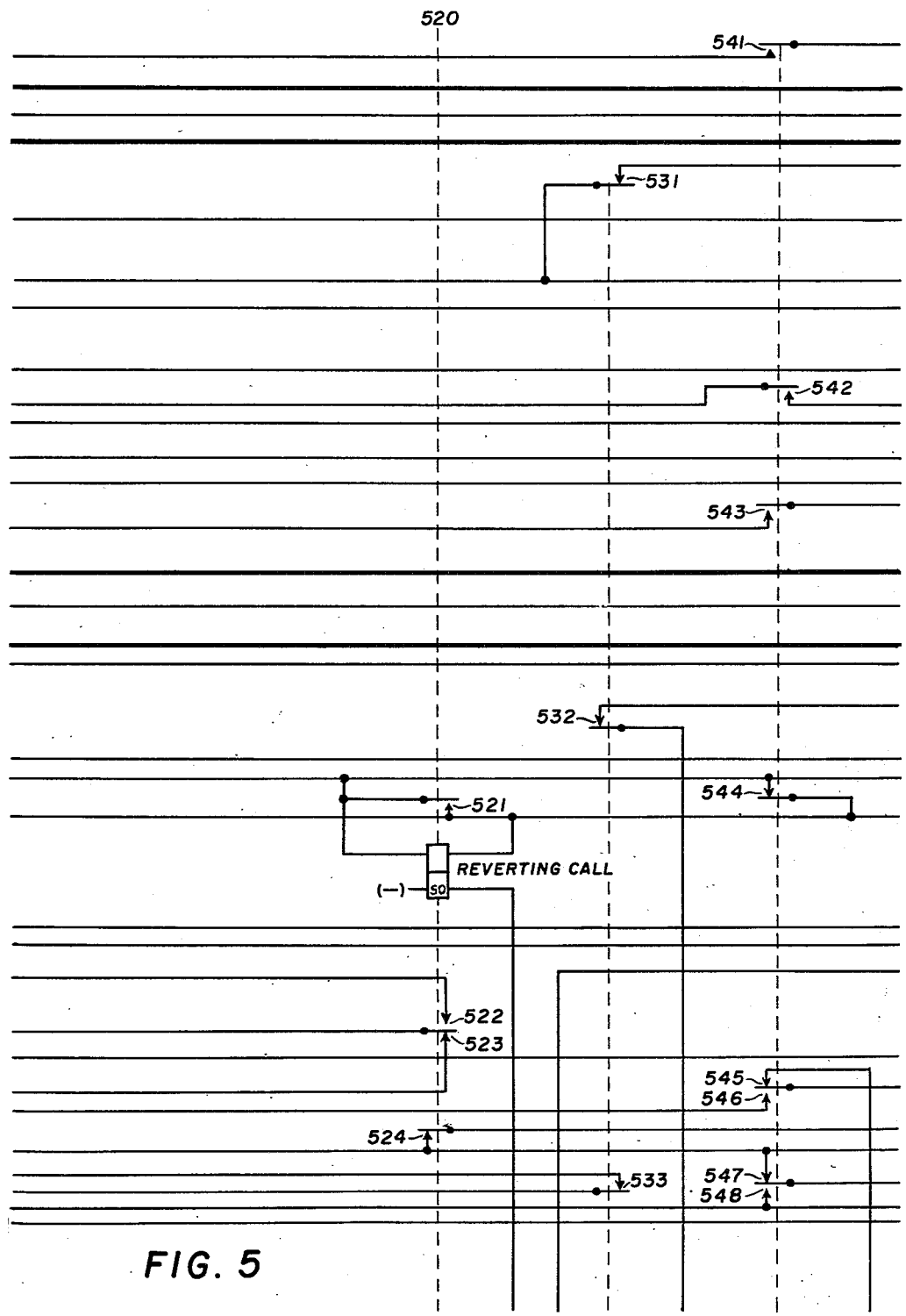

May 14, 1957 W. W. PHARIS 2,792,452
COMMUNITY DIAL OFFICE STEP-BY-STEP CONNECTOR
Filed March 15, 1954 17 Sheets-Sheet 1

INVENTOR.
WILLIAM W. PHARIS
BY F. H. Henson
AGENT

United States Patent Office 2,792,452
Patented May 14, 1957

2,792,452
COMMUNITY DIAL OFFICE STEP-BY-STEP CONNECTOR

William W. Pharis, Rochester, N. Y., assignor, by mesne assignments, to General Dynamics Corporation, a corporation of Delaware Application March 15, 1954, Serial No. 416,018

8 Claims. (Cl. 179—18)

This invention relates to automatic telephone systems and more particularly to community dial office step-by-step connectors for use in automatic telephone systems.

In small community dial offices which serve less than 100 subscriber lines, a multi-purpose connector is utilized to complete connections between subscriber lines in the community dial office and also to complete connections to trunk lines terminating in distant offices. The P. B. X trunk hunting feature is also provided in connectors of this type so that individual subscribers in the community dial office may have several lines which are reached by dialing the same directory number.

It is a general practice to terminate subscriber lines and P. B. X trunk line groups in the same level of the switch banks with the connector switch being directively controlled in its secondary motion to select either an individual subscriber line or the first trunk line of the P. B. X group. If the first trunk line of the P. B. X group is busy, the switch is then automatically advanced to select an idle trunk line in the group.

It has been the practice prior to this invention to set aside a complete level of the switch banks for trunk lines leading to a distant office. Since the traffic between the small community dial office and the distant office usually does not warrant the use of ten trunk lines, the majority of the terminals in the level may be left vacant. If trunk line groups to more than one distant exchange are required, the inefficiency is multiplied.

It is, of course, desirable to use every available terminal in the switch banks to avoid the necessity of adding a second rank of switches when the number of subscriber lines in the exchange approaches the capacity of the switch banks.

Accordingly, it is the general object of this invention to provide a new and improved community dial office step-by-step connector.

It is a more specific object of this invention to provide a new and improved community dial office step-by-step connector which permits a more efficient use of its switch terminal banks.

Briefly, the invention accomplishes the above cited objects by providing a connector which is arranged to establish connections to either trunk lines terminating in a distant office, subscriber lines, or P. B. X trunk lines which may all terminate in a given level of its switch terminal bank. The connector circuit is arranged to normally automatically advance the switch brushes in a secondary direction to select an idle trunk line in the group of trunk lines which extend to the distant office when the given level is selected. If, however, a particular drop back level is dialed prior to the selection of the given level, the automatic secondary advancing means is disabled so that the switch is thereafter controlled by directive impulses for secondary advancement.

A particular advantage of this arrangement is realized when restricted service is required on connections to certain subscriber lines and also to certain trunk groups. Since the subscriber lines and the trunk lines may terminate in the same level of the switch banks, the restriction may be accomplished on a level basis rather than on a per line basis. The connector circuit is arranged to automatically advance the switch brushes to an overflow position whenever a calling subscriber line of a particular class controls the connector to select the restricted level. The automatic advancement of the brushes to overflow is effective whether the level is selected initially or after drop back from the particular drop back level. In the latter case the automatic advancement is delayed until the complete directory number of the called line is dialed.

Further objects and advantages of the invention will become apparent as the following description proceeds and the features of novelty which characterize the invention will be pointed out in particularity in the claims annexed to and forming a part of this specification.

For a better understanding of the invention, reference may be had to the accompanying drawings. The drawings consist of 18 figures on 17 sheets and, when arranged according to Fig. 18, show the invention.

Fig. 1 shows the trunking diagram of the described system.

Figs. 2–17, inclusive, show a community dial office step-by-step connector in detailed form.

The general operation of the system can best be understood by reference to the trunking diagram of Fig. 1. Local subscriber stations, such as Sub. 1, can extend connections to other local subscriber stations through the associated line circuit, such as local line circuit 10, line finder 40, and the connector 70. Conductors T1, R1, and S6, which terminate in the connector banks, are shown connected to local line circuit 10 for use when local line 10 is called. It is, of course, understood that similar conductors extend to all of the local line circuits in the community dial office.

P. B. X trunk lines terminate in line circuits, such as P. B. X line circuit 60, in the community dial office. Connector bank terminals T3, R3, and S7 are shown connected to P. B. X line circuit 60 for use in extending a connection to the P. B. X 50. Calls originating in the P. B. X are routed through the P. B. X line circuit 60, and over conductors T3, R3, and S3 to line finder banks and thus to the connector 70.

Trunk lines from the distant exchanges, such as trunk line 25, terminate in trunk circuits, such as trunk circuit 30, in the community dial office. Local subscriber stations seize trunk circuit 30 by way of connector bank terminals T5, R5, and S5 for outgoing service.

The distant office operator obtains connection to subscriber stations in the community dial office by way of trunk line 25, trunk circuit 30, toll line circuit 20, line finder 40, and connector 70.

The connector has been shown as including a flat type step-by-step switch of the type sold under the trademark "XY". For a detailed disclosure of this switch, reference may be made to the Frank A. Morris Patent 2,567,650, which issued September 11, 1951, and is assigned to the same assignee as the present invention. Briefly, the switch has a main set of brushes, namely, line conductors tip and ring, and control conductors sleeve and hunt sleeve, which move horizontally in a primary direction to select a level of terminals and then move into the banks to select a particular set of terminals in the selected level. The switch also has an auxiliary set of brushes X and XX. These brushes are normally positioned before a level of auxiliary contacts. The X and XX brushes move into the level of auxiliary contacts simultaneously with the primary motion of the main brushes. Thus, the positioning of the auxiliary brushes corresponds to the level selected by the main brushes.

Figure 7:
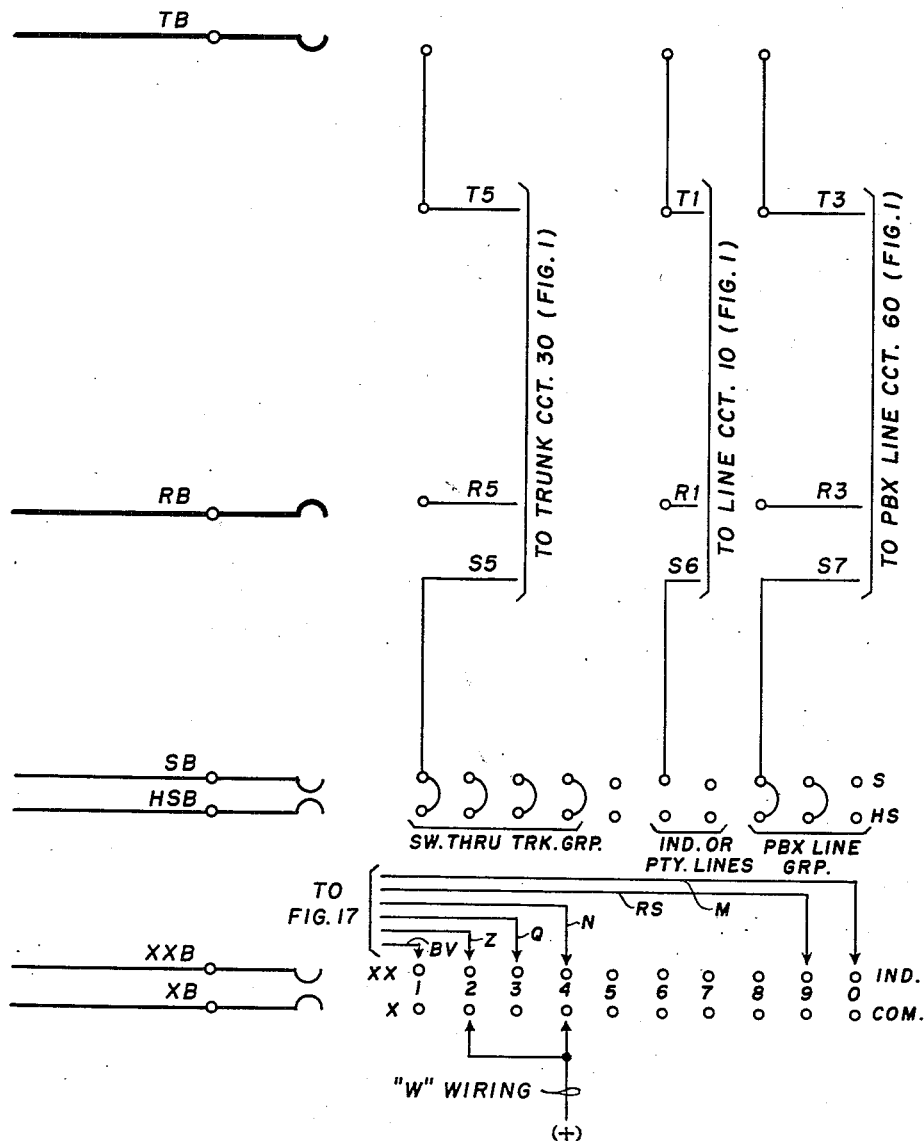

The connector circuit is arranged to be differently controlled when different levels are selected by means of wiring of the X and XX bank contacts. Referring to Fig. 7, it can be seen that various optional wiring may be connected to the individual X and XX bank terminals. The various wirings of the X and XX bank terminals control the connector circuit to cause the switch brushes to either restore to normal, automatically advance in the secondary direction to select an idle trunk line, or to remain positioned before the selected level when the level associated with the respective wiring is dialed before an unlocking level is dialed. If the wiring causes the brushes to remain positioned before the selected level, busy tone is returned to the calling party and subsequent digits dialed into the connector are ineffective.

However, after the selection of an unlocking level, all of the above described wirings are ineffective. The switch brushes remain positioned before the selected level and the connector circuit is controlled by subsequently received directive impulses to advance the switch brushes in a secondary direction.

It is believed that it might be helpful to a more complete understanding of the invention to set forth in tabular form the use of the various wiring of the X and XX bank terminals.

The X and XX banks are wired as follows:

N and W—Wiring on level requiring digit adding, if dialed as first digit, with digit canceling after added digit until the unlocking digit is dialed.
N—Wiring on level requiring busy tone, if dialed before added digit, with digit canceling after added digit until the unlocking digit is dialed.
Q—Wiring on level requiring busy tone, if dialed before added digit, and automatic trunk hunting and switch through if dialed after digit adding, but before unlocking digit.
Z—Wiring on level of unlocking digit with busy tone, if dialed before first added digit.
Z and W—Wiring on level of unlocking digit to unlock either with or without added digit.
BV—Wiring on level used as prefix for busy verification by toll operator.
RS—Wiring on level restricted to line circuits marked by ground on HS lead in line circuit. This level is arranged for automatic trunk hunting and switch through if dialed before unlocking and with contacts not used for trunk group available for regular lines.
No wiring—Levels requiring busy tone before first added digit and with use of level after unlocking.

Special wiring of the sleeve and hunt sleeve terminals S and HS, respectively, in the main banks is also shown in Fig. 7. Switch through trunk groups, which are groups of trunk circuits which connect to trunk lines terminating in a distant office, are identified by a connection between the S and HS terminals of the individual trunk circuits of the group. A vacant set of terminals, which serves as an all trunks busy position for the group of trunk lines, immediately succeeds the set of terminals which terminates the last trunk circuit of the trunk group. Individual or party subscriber lines are identified by the absence of a connection between the S and HS terminals. A P. B. X trunk line group is identified by a connection between the S and HS terminals of all of the individual trunk lines except the last trunk line in the P. B. X group.

In the drawings and description, the exchange battery is shown as plus (+) and minus (—) and described as ground and battery respectively. It is to be understood that in this system the positive terminal of the battery is grounded and is, therefore, referred to as ground. The negative terminal of the battery is referred to as battery.

A detailed description of the system follows.

LOCAL CALLS

Called line idle

A call from a local subscriber station, such as Sub. 1, to another local subscriber station will first be described. From the preceding general description it will be understood that it is necessary to dial an unlocking digit (such as a digit corresponding to a level having Z and W wiring on XX and X bank terminals, respectively) before the tens, units and ringing digits of the called subscriber's line are dialed. It is to be understood that several digits may be dialed and absorbed before the unlocking digit is dialed for the purpose of achieving the well known 2–5 numbering scheme. The digit adding function of the connector is described separately in the latter part of the description and so is omitted from this portion of the description.

When the calling subscriber at Sub. 1 lifts his handset, local line circuit 10 and line finder 40 serve to connect the loop circuit closed at the subset to tip and ring conductors T4 and R4, respectively, of the connector circuit.

In response to the finding of the line and the resulting connection of the loop circuit to the tip and ring conductors T4 and R4, respectively, calling bridge relay 320 operates. The operating circuit for relay 320 extends from ground through break contacts 212 on unoperated relay 210, the upper winding of relay 320, break contacts 311 on unoperated relay 310, break contacts 211 on unoperated relay 210, break contacts 201 on unoperated relay 800, tip conductor T4, line finder 40, the finder tip brush FT, tip conductor T1, through the loop circuit closed at the calling subset, ring conductor R1, line finder ring brush FR, ring conductor R4, break contacts 203 on unoperated relay 800, break contacts 214 on unoperated relay 210, break contacts 314 on unoperated relay 310, and through the lower winding of relay 320 to battery. At operated make contacts 922, relay 320 closes an operating circuit for relay 900.

Release delay relay 900 now operates over a circuit extending from ground on break contacts Z141 on the unoperated release magnet M153, through break contacts 1118 on unoperated relay 1110, break contacts 1044 on unoperated relay 440, break contacts 806 on unoperated relay 800, operated make contacts 922 on relay 320 and through its winding to battery. At its operated make contacts 301 and 302, relay 900 shunts the break contacts 211 and 214, respectively, on unoperated relay 210 in the previously described operating circuit of relay 320. At its operated make contacts 304, relay 900 closes ground through break contacts 544 on unoperated relay 1140 to the sleeve conductor S4 to hold the switch through relay (not shown) of line finder 40 and the cut-off relay (not shown) of line circuit 10 operated in the well known manner. At its operated make contacts 901, relay 900 closes an operating circuit to the reverting call delay relay 210.

Relay 210 now operates over a circuit extending from the previously mentioned ground on operated make contacts 901 of relay 900, through break contacts 812 on relay 210, break contacts 801 on unoperated relay 800, and through its lower winding to battery. At its make contacts 811, relay 210 locks operated to the previously described ground on the sleeve conductor S4. The monitor lamp L131 is now illuminated over a circuit extending from ground on break contacts 912 of unoperated relay 310, break contacts 804 of relay 800, operated make contacts 816 on relay 210, and through the lamp to battery on the MSR lead. At its operated make contacts 814, relay 210 connects ground through break contacts 803 on relay CT to the master ground lead MG.

Responsive to the connection of ground to the master ground lead MG, the primary delay relay 940 operates over a circuit extending from ground on conductor MG through primary off-normal break contacts PRI. ON91, which operate when the switch moves off-normal in its primary direction, and through its upper winding to battery. Secondary delay relay 1010 operates over a circuit extending from ground on the master ground lead MG, through secondary off-normal break contacts SEC. ON101, which operate when the switch is stepped off-normal in the secondary direction, and through its lower winding to battery. Party delay relay 1020 operates over a circuit extending from ground on the master ground lead MG through overflow break contacts OF102, which operate when the switch is advanced to the overflow position in either a primary or secondary direction, break contacts 1042 on unoperated relay 440, ringing selecting switch off-normal break contacts RS. ON122, which operate when the ringing switch is advanced off-normal, and through its upper winding to battery. Trunk hunting delay relay 930 is operated at this time over an obvious circuit extending from ground through operated make contacts 1021 on relay 1020.

The connector is now ready to receive directive impulses as signified by the fact that dial tone is now connected to the calling party. The dial tone circuit extends from the dial tone lead of Fig. 6 through primary off-normal break contacts PRI. ON61, which operate when the switch is advanced off-normal in its primary direction, break contacts 631 on unoperated relay 1730, break contacts 621 on unoperated relay 1720, break contacts 433 on unoperated relay 1530, break contacts OF41, which operate when the switch is advanced to an overflow position in either the primary or secondary direction, operated contacts 213 on relay 210, the upper winding of relay 320 to the tip conductor T4 and thus to the calling subscriber. It can be seen that this operation serves to replace the direct ground through the upper winding of relay 320 to the calling line with grounded dial tone.

Assume that the calling subscriber first dials the digit "2." The XX and X bank terminals of level two, shown in Fig. 7, are equipped with Z and W wiring, respectively, and identify the level as an unlocking level. In response to each interruption of the calling loop circuit by the dial springs, calling bridge relay 320 releases and, at its break contacts 923, repeats the pulses to the combination lock pulse and hunt assist relay 1600. Relay 900 remains operated during impulsing because of its slow release characteristic. The operating circuit for relay 1600 extends from ground on break contacts Z141 of the unoperated release magnet M153, through break contacts 1118 on unoperated relay 1110, break contacts 1044 on unoperated relay 440, break contacts 806 on unoperated relay 800, break contacts 923 of now released relay 320, operated make contacts 943 on relay 940, operated make contacts 902 on relay 900, operated make contacts 933 on relay 930, the upper and middle windings of relay 1600 in parallel, break contacts 1601 on relay 1600 and through break contacts Z153 on release magnet M153 to battery.

At its operated make contacts 1102, relay 1600 repeats the impulses to the primary magnet M151. The circuit extends from ground on operated make contacts 1102 on relay 1600, through operated make contacts 1023 on relay 1020, operated make contacts 1014 on relay 1010, operated make contacts 942 on relay 940, and through the primary magnet M151 to battery. This ground also extends through the lower winding of primary delay relay 940 to battery. The energizing circuit for the upper winding of relay 940 is opened by PRI. ON91 contacts when the switch takes a step off-normal but the relay is held energized over its lower winding during impulsing. Operated make contacts 1101 on relay 1600 connect ground on the master ground lead MG through SEC. INT.162 contacts, which operate when the secondary magnet M152 operates, through break contacts PRI. INT.171, which operate when the primary magnet M151 operates, break contacts R.S. INT.123, which operate when the ringing selecting switch stepping magnet M122 operates, through break contacts 1215 on unoperated relay 1210, operated make contacts 933 on relay 930, to the winding of relay 1600. It can be seen that this circuit through operated make contacts 1101 on relay 1600 will hold relay 1600 operated until the primary magnet M151 has had sufficient time to operate, as signified by the operation of its interrupter contacts PRI. INT.171 regardless of the length of pulse delivered to relay 1600 at the break contacts 923 of the calling bridge relay 320. This is the so-called lock pulse feature which assures proper operation of the switch even though the calling bridge relay 320 is pulsed over a very long or heavily loaded subscriber line.

Relays 320 and 1600 and primary magnet M151 are operated twice in response to the dialing of the digit "2," and the switch is stepped to level two. At the termination of the second impulse, primary delay relay 940 is de-energized for sufficient time to allow its release.

An operating circuit for relay 1720 is closed in response to the release of primary delay relay 940 from W wiring ground on X bank terminal 2 of Fig. 7, and through the X brush XB of the connector switch, break contacts 1731 on unoperated relay 1730, operated make contacts 1521 on relay 1020, break contacts 1442 on now released relay 940, break contacts 1721 on unoperated relay 1720, and through the winding of relay 1720 to battery. First digit adding relay 1720 operates in this circuit and closes a locking circuit for itself through its operated make contacts 1722, break contacts 1441 on unoperated relay 940 and operated make contacts 304 on relay 900 to ground.

Also responsive to the release of the primary delay relay 940, ground on master ground conductor MG is connected through break contacts 341 on relay 940 over the XX brush XXB of the connector switch, the second XX bank terminal, Z wiring, operated make contacts 1723 on relay 1720, the winding of relay 1730, break contacts 1734 on unoperated relay 1730, break conacts Z153 on release magnet M153 to battery. Second digit adding relay 1730 operates in this circuit. At its operated make contacts 1733', relay 1730 closes a ground locking circuit for itself from ground on operated make contacts 304 on relay 900, and at its operated make contacts 1735, closes a direct battery locking circuit for its winding. The ground on the XX brush XXB, which was previously described as being connected to Z wiring, is now further connected through operated make contacts 1737 on relay 1730, operated make contacts 1725 on relay 1720, operated make contacts 1312 on relay 210, break contacts 1303 on unoperated relay 800, break contacts 1711 on unoperated relay 1210, operated make contacts PRI. ON151 and through the winding of release magnet M153 to battery.

Release magnet M153 operates in this circuit to restore the switch brushes to normal. When the switch brushes restore to normal, primary off-normal contacts PRI. ON91 reclose to reenergize the primary delay relay 940 on its upper winding. When relay 940 operates, it opens break contacts 1441 to open the previously described locking circuit for the first digit adding relay 1720 which now releases.

It is to be noted that the dialing of an unlocking level is signified by the operation of the second digit adding relay 1730 which is now locked operated. Dial tone is not reconnected to the calling party when the switch is restored to normal after selection of an unlocking level since break contacts 631 of relay 1730 effectively open the circuit. Ground for the upper winding of calling bridge relay 320 is supplied from operated make contacts 632 of relay 1730.

Assume that the last three digits of the called subscriber line number are "971." The calling subscriber now operates his dial to transmit nine impulses. Calling bridge relay 320 releases on each impulse to operate hunt assist relay 1600 which in turn repeats the impulses to the primary magnet M151, all as previously described. In response to the directive impulses of this digit, primary magnet M151 serves to step the switch brushes to level nine. At the completion of the digit, primary delay relay 940 releases and at its break contacts 341 again connects ground to the XX brush XXB. Since level nine is equipped with RS wiring on its XX bank terminal, the ground on brush XXB is connected over RS wiring through break contacts 1702 on unoperated relay 1200 to an open contact 1736 on operated relay 1730. Thus the RS wiring is ineffective when dialed after the dialing of an unlocking level which is signified by the operation of relay 1730.

The calling subscriber now dials the units digit "7" of the called subscriber line number. Calling bridge relay 320 again repeats the impulses to the hunt assist relay 1600. Operated make contacts 1231 on relay 1730 shunt the open contacts 943 on relay 940 in the operating circuit of relay 1600. Since the primary delay relay 940 is released, the hunt assist relay 1600 repeats the impulses to the secondary magnet M152. The operating circuit for the magnet M152 extends from ground on operated make contacts 1102 of relay 1600 through operated make contacts 1023 on relay 1020, operated make contacts 1014 on relay 1010, break contacts 941 on unoperated relay 940, and through magnet M152 to battery. The impulsing circuit also extends through operated make contacts 1013 on relay 1010 and through the upper winding of relay 1010 to battery. The secondary delay relay 1010 remains operated in this circuit during the impulsing of the second digit even though its lower winding is deenergized when the brushes take one step off-normal in the secondary direction by the opening of the secondary off-normal contacts SEC. ON101. At the completion of the dialing of the units digit, relay 1010 releases. The lock pulse circuit for contacts 1101 on relay 1600 to the winding of relay 1600 is controlled by SEC. INT.162 contacts during the units digit.

The calling subscriber now dials the ringing digit which is assumed to be "1." Calling bridge relay 320 repeats the impulse to hunt assist relay 1600 which now repeats the impulse to the ringing selecting switch stepping magnet M122. The operating circuit for magnet M122 extends from ground on operated make contacts 1102 on relay 1600, through operated make contacts 1023 on relay 1020, break contacts 1015 on unoperated relay 1010 and through the winding of magnet M122 to battery. The lower winding of party delay relay 1020 is energized by the impulse to maintain the relay operated even though its upper winding is deenergized, when the ringing selecting switch is stepped off-normal, by the operation of the off-normal contacts R.S. ON122. It is to be noted that the lock pulse action of the relay 1600 is effective on this digit as it was on the preceding digits. Operated make contacts 1101 again connect a holding ground for relay 1600 through the series connected interrupter contacts of the various switch magnets. On the third digit, this circuit is controlled by the operation of the ringing selecting switch interrupter contacts R.S. INT.123.

At the completion of the ringing digit, party delay relay 1020 releases. At its contacts 1021, relay 1020 opens the energizing circuit for trunk hunting delay relay 930 which now releases. It might be mentioned that a busy test of the called line is made during the release time of relay 930, but since it is assumed that the called subscriber's line is idle, the busy test relay 1140 does not operate at this time. An operating circuit is closed for the switch through relay 1210 responsive to the release of relay 930.

Switch through relay 1210 operates over a circuit extending from ground on operated make contacts 306 on relay 900, through break contacts 524 on unoperated relay 520, or break contacts 547 on unoperated busy test relay 1140, through the upper winding of switch through relay 1210, break contacts 438 on unoperated relay 1530, break contacts 332 on now released relay 930, break contacts 421 on unoperated relay 1020, operated make contacts 215 on relay 210, break contacts 205 on unoperated relay 800, break contacts 442 on unoperated relay 440, the sleeve brush SB to battery through the cut-off relay (not shown) of the called line circuit. Switch through relay 1210, upon operating, closes a locking circuit from ground on the master ground lead MG and through its operated preliminary make contact 1213 and through its lower winding to battery. Relay 1210 also connects ground on operated make contacts 306 of relay 900, through its operated make contacts 619 to the sleeve brush SB to effectively remove the resistance of the upper winding of relay 1210 from the sleeve circuit.

Ring back tone is now connected to the calling line to notify the calling party that the called line is idle and is being rung. The circuit extends from the ring back tone conductor of Fig. 6 through capacitor C61, break contacts 531 on unoperated relay 1130, operated make contacts 612 on relay 1210, capacitor C32 to the ring conductor R4 and thus to the calling line.

Figure 8:
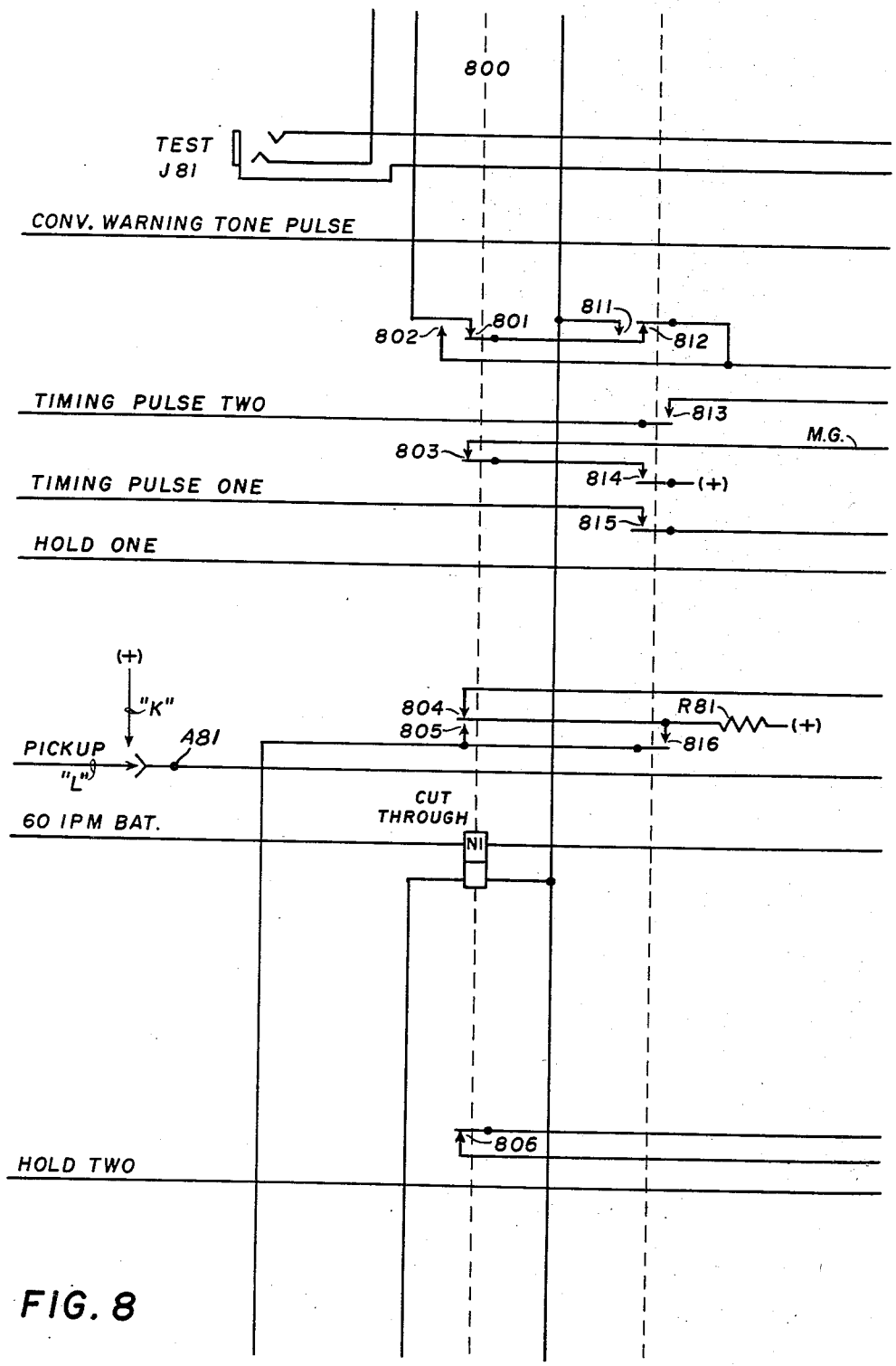
Figure 9:
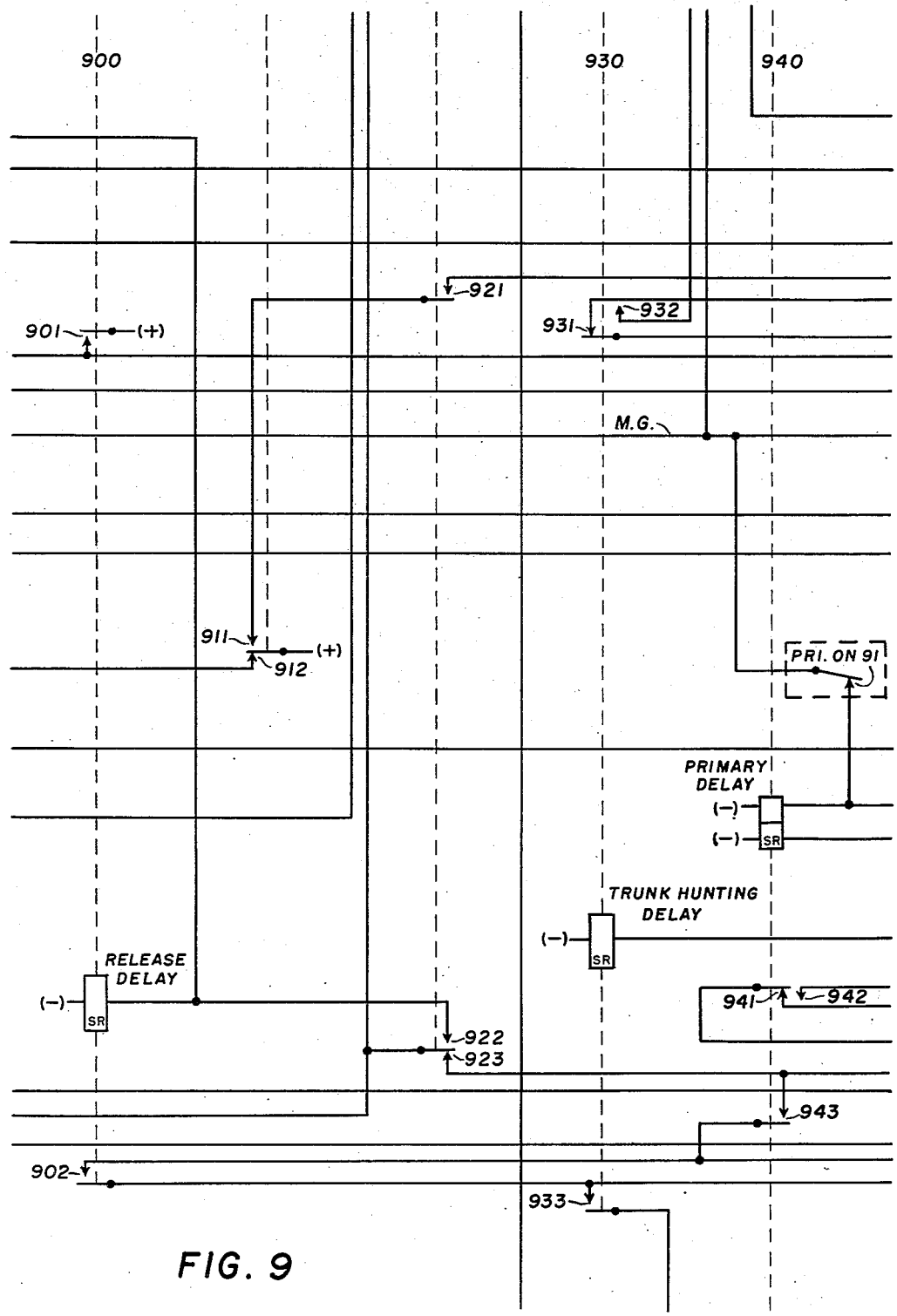

In Fig. 8 optional wirings K and L are shown. K wiring is used if the connector is equipped for harmonic ringing, and L wiring is used if the connector is equipped for code ringing. If L wiring is used, ground is not connected to terminal A81 until a ground pulse appears on the pickup lead which pulse occurs at the beginning of a code cycle. Regardless of which wiring is used, when ground appears on this conductor after operation of the switch through relay 1210, secondary delay relay 1010 is reoperated to initiate ringing of the called subscriber line. The operating circuit for relay 1010 extends from ground on terminal A81 of Fig. 8, through break contacts 1011 on unoperated relay 1010, break contacts 1135 on unoperated relay 1130, operated make contacts 1214 on relay 1210, and through the lower winding of relay 1010 to battery. At its operated make contacts 1012, relay 1010 closes a holding circuit for its lower winding and at the break portion 1011 of the same make-before-break combination, opens the original energizing circuit.

Figure 6:
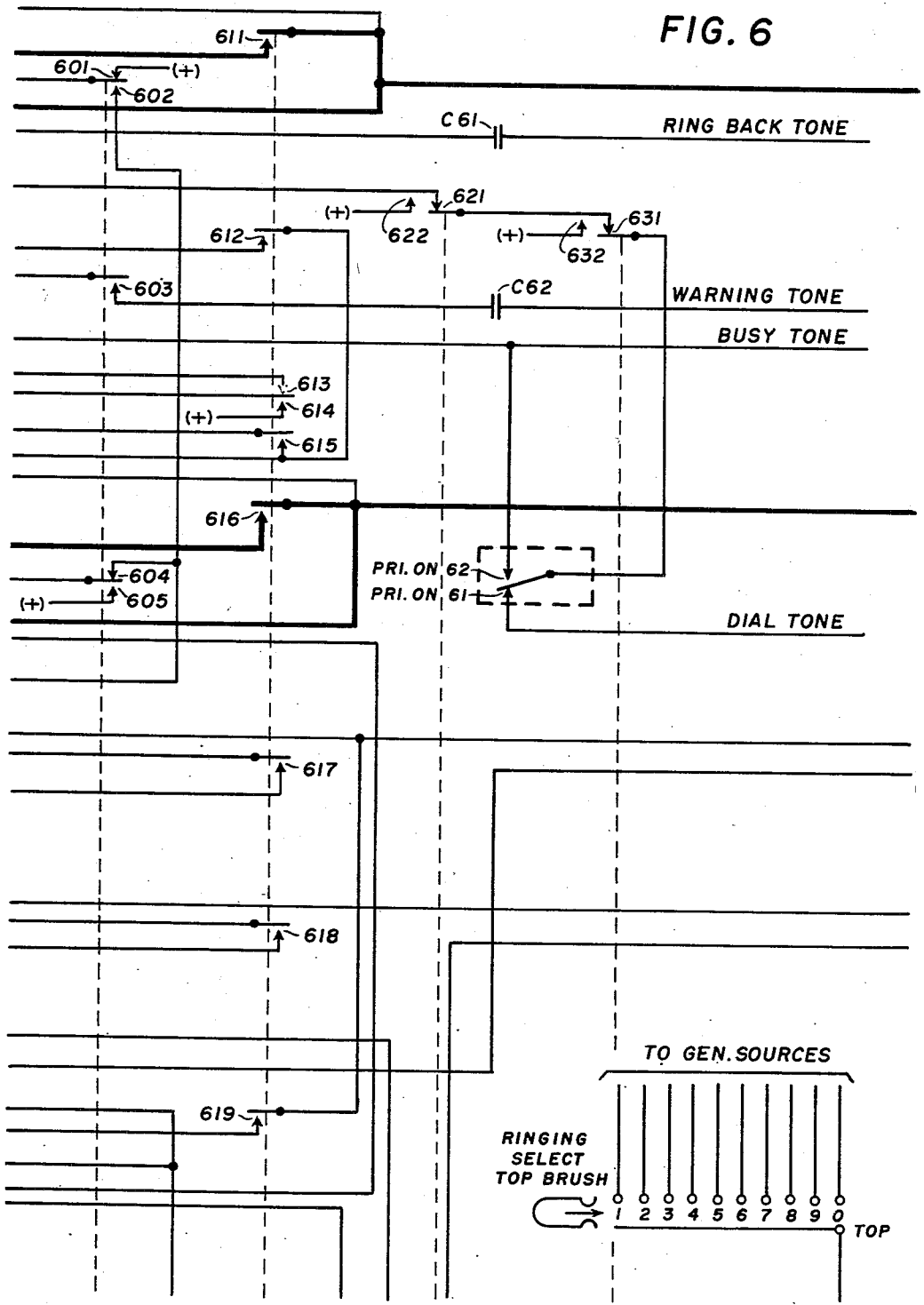

The selected generator frequency, or code, is now connected from terminal one of the top ringing selecting switch bank, shown in Fig. 6, through the ringing select top brush, the common bar of the top bank, through the upper winding of ring trip relay 1130, break contacts 532 on unoperated relay 1130, break contacts 604 on unoperated relay 1200, operated make contacts 414 on relay 1010, operated make contacts 616 on relay 1210, the ring brush RB, over the called subscriber's ring line conductor, through the ringer at the substation, back over the subscriber's tip line conductor, tip brush TB, operated make contacts 611 on relay 1210, operated make contacts 412 on relay 1010, and through break contacts 601 on unoperated relay 1200 to ground. The selected subscriber's ringer is now energized over this circuit.

Figure 12:
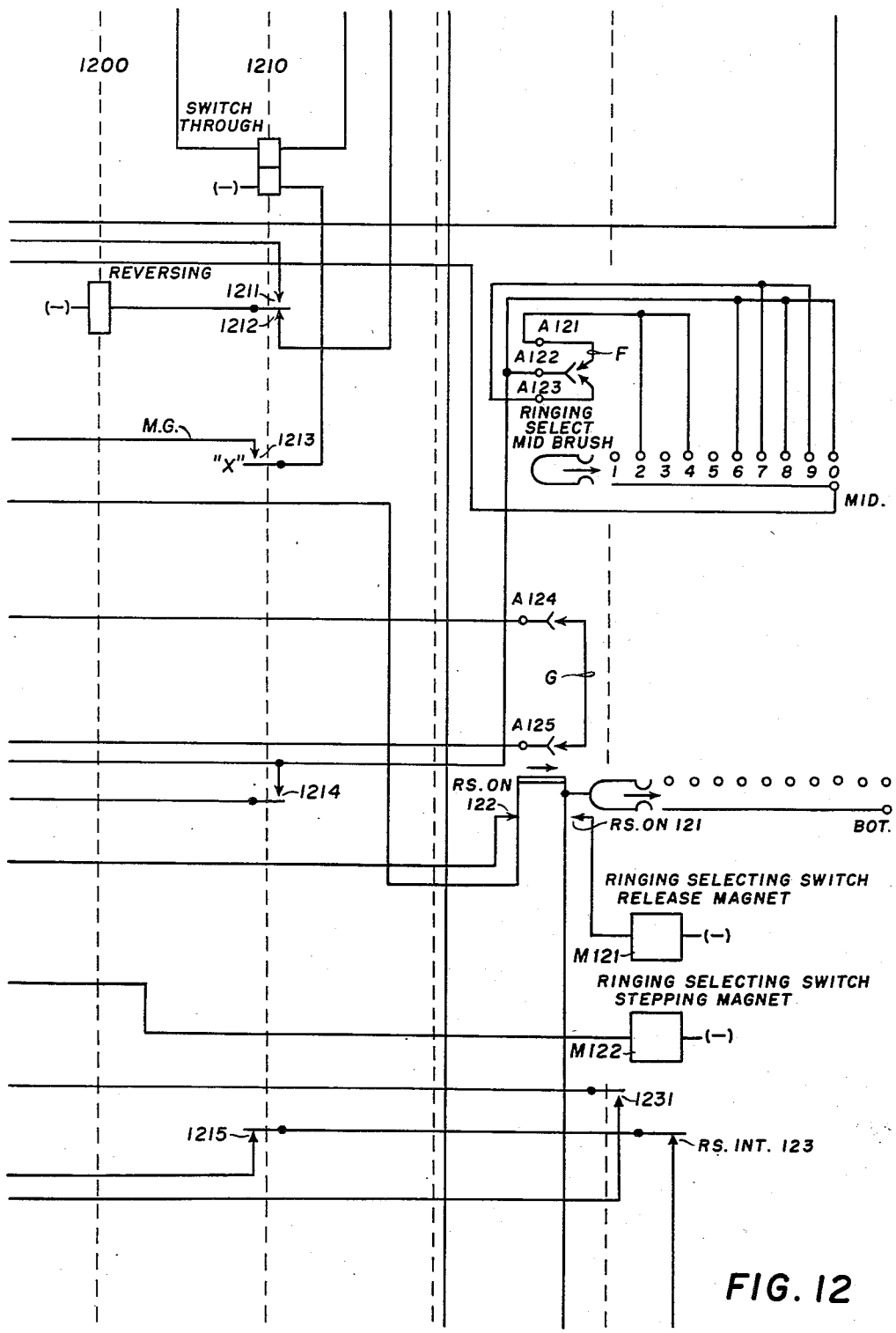
Figure 13:
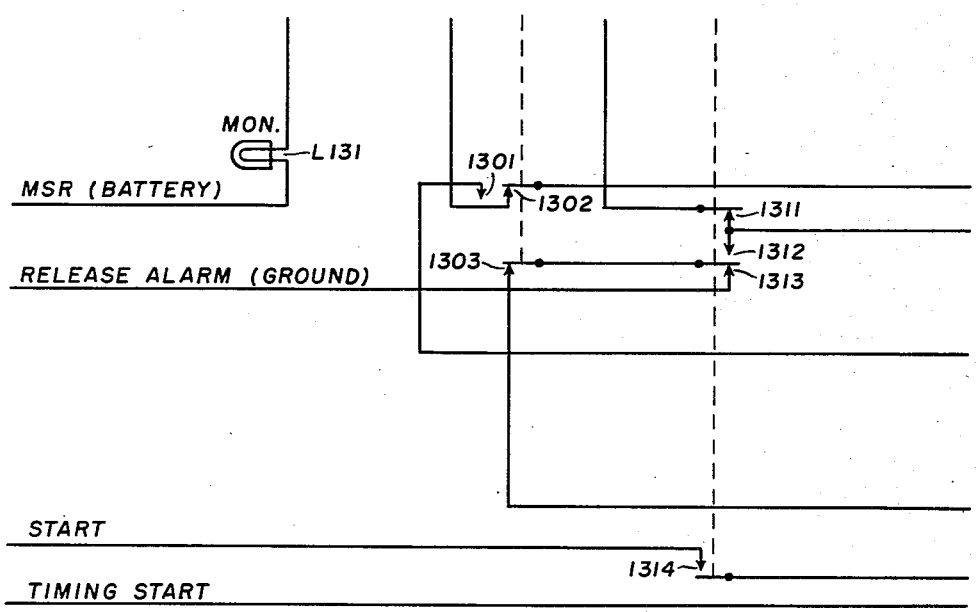
Figure 14:
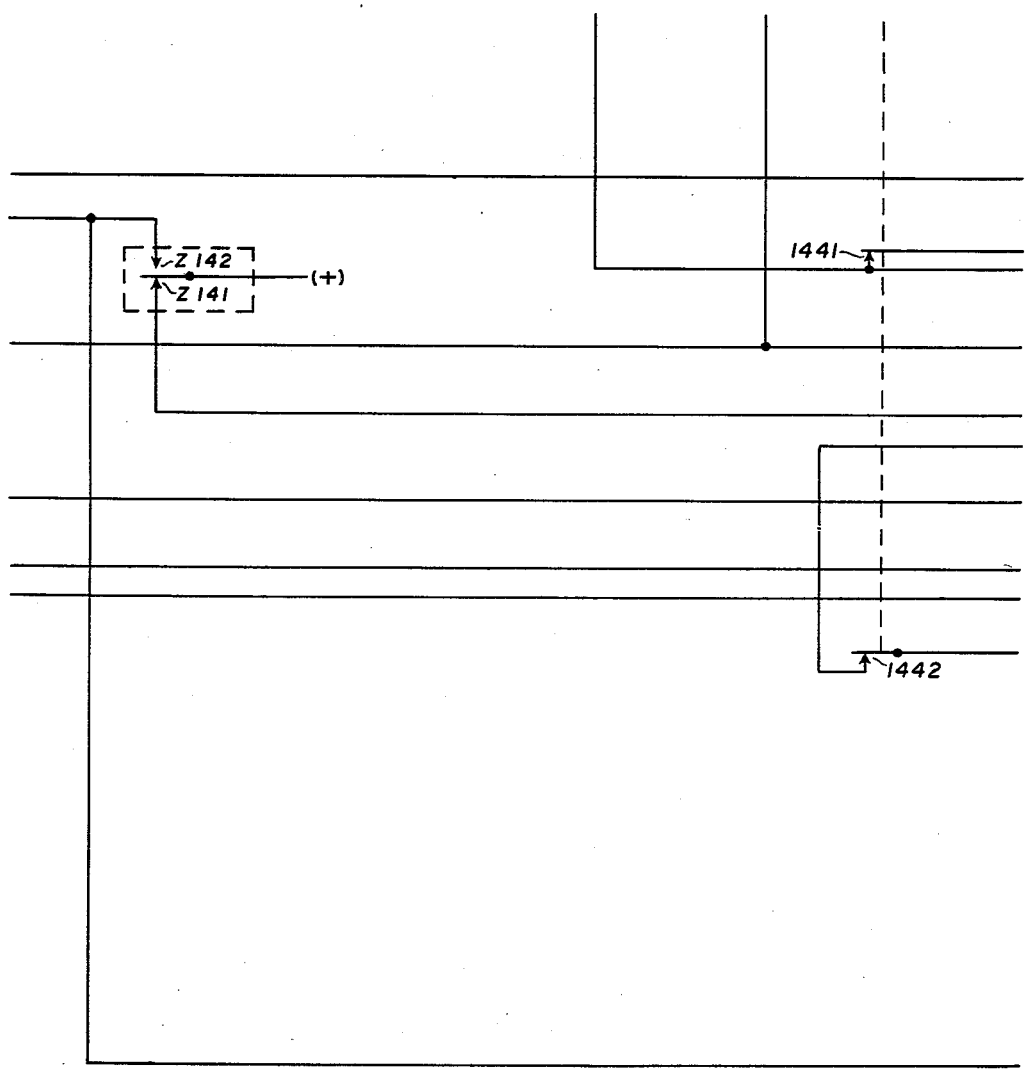
Figure 15:
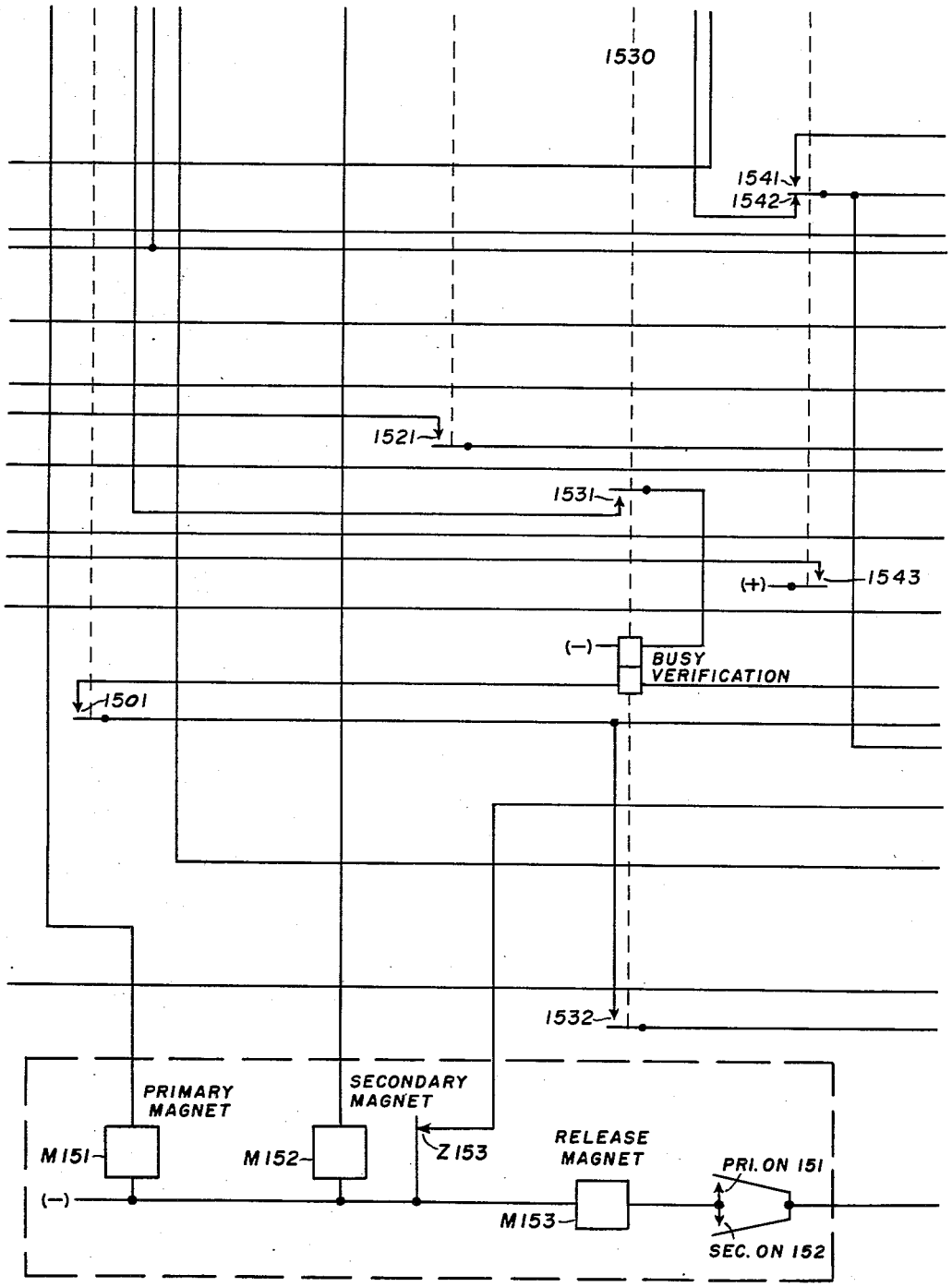
Figure 16:
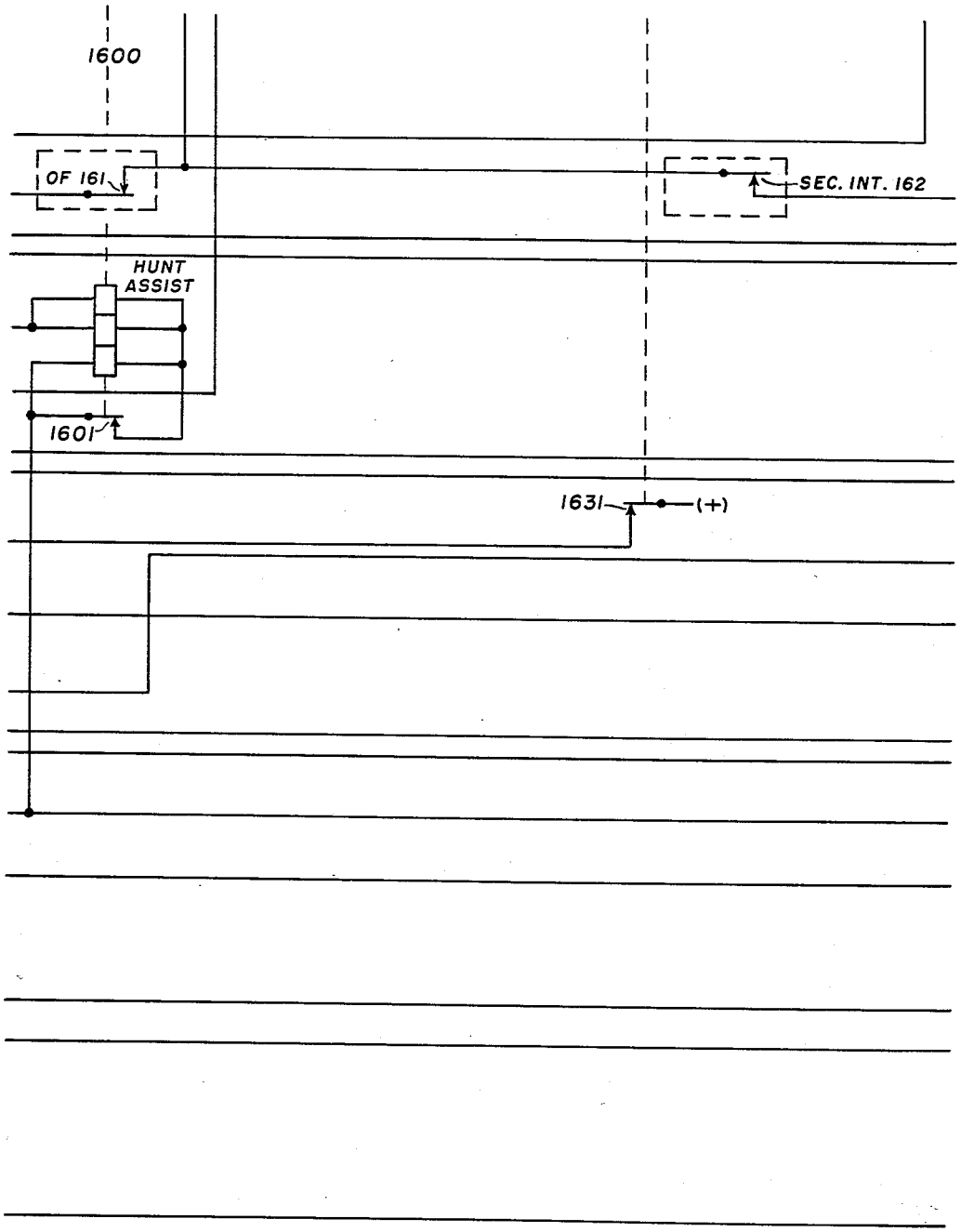

Reversing relay 1200 is utilized to reverse the application of ringing to the called line when certain subscriber stations are selected when divided ringing is used. This reversal is controlled by the wiring on the mid banks of the ringing selecting switch. This wiring is shown in Fig. 12. If F wiring is used, connection between terminals A121 and A122, even numbered subscribers' lines are rung on the tip conductor. If E wiring is used, connection between terminals A122 and A123, the subscribers' lines with ringing digits from 6 to 0 are rung on the tip side of the line. The operating circuit is closed from ground on the pickup conductor of Fig. 8 on terminal A81 and through break contacts 1011 on unoperated relay 1010, break contacts 1135 on unoperated relay 1130, operated make contacts 1214 on relay 1210, through the wiring used on the mid bank terminals, the ringing select mid brush, the common bar of the mid banks, break contacts 1122 on unoperated relay 520, operated make contacts 1211 on relay 1210, and through the winding of reversing relay 1200 to battery. It can be seen that relay 1200 is operated in parallel with relay 1010 from the pickup pulse and is locked operated in parallel with relay 1010 from ground on operated make contacts 1012 of relay 1010. At its operated contacts 601, 602, and 604, 605, reversing relay 1200 connects the previously described generator path to the tip conductor and ground potential to the ring conductor.

When the called party answers, in response to the ringing signal, a direct current path is closed through the subset for the operation of the ring trip relay 1130. Relay 1130 closes a locking circuit from ground on the master ground conductor MG through its operated make contacts 1132 and through its lower winding to battery. At its now operated contacts 532, relay 1130 opens the previously described generator circuit to the called line. At its operated contacts 1135, relay 1130 opens the previously described holding circuit for relay 1010 and for reversing relay 1200, in the event that it is operated. At its operated contacts 531, relay 1130 opens the previously described ring back tone circuit to the calling party.

It might be mentioned at this time that the ring trip relay 1130 has an alternate locking path for its secondary winding which is utilized to fully operate the relay on very long lines and also to prevent the premature operation of the relay from alternating current on a heavily loaded line. When the ring trip relay 1130 is energized over a circuit which has current flow sufficient only to operate the preliminary make contact 1136 on relay 1130, master ground on conductor MG is connected through break contacts 1131 on relay 1130 and through the preliminary make contact 1136 to the upper winding of the primary delay relay 940. Relay 940 operates in this circuit and connects ground on the master ground conductor MG, through operated make contacts 342, operated make contacts 518 on relay 1210, and through the lower winding of relay 1130 to battery. This direct ground causes relay 1130 to fully operate and close the previously described locking circuit through contacts 1132. Relay 940 is then released by the opening of break contacts 1131 when relay 1130 completely operates.

Responsive to the operation of the ring trip relay and the release of the secondary delay relay 1010, the called subscriber's loop circuit is now effective to operate the answer bridge relay 310. The operating circuit for relay 310 extends from ground on operated make contacts 614 on relay 1210, through the upper winding of relay 310, break contacts 411 on unoperated relay 1010, operated make contacts 611 on relay 1210, tip brush TB, over the called subscriber's loop circuit, ring brush RB, operated make contacts 616 on relay 1210, break contacts 413 on relay 1010, operated make contacts 615 on relay 1210, and through the lower winding of relay 310 to battery. At contacts 311, 312, and 313, 314, relay 310 reverses the polarity of the tip and ring conductors extending to the calling line circuit.

The reverse battery may be utilized to operate message register equipment, or to control paystation equipment in the well known manner. At operated contacts 316, relay 310 closes resistance battery of the non-inductive winding of relay 440 through break contacts 334 on relay 930 and break contacts 343 on relay 940 to the hunt sleeve conductor HS4. This resistance battery performs no function on a local call. At operated contacts 912, relay 310 removes direct ground from the monitor lamp L131. Lamp L131 is now energized from ground through resistor R81 so that it becomes dim, thus signifying that the connector is in the talking condition.

Responsive to the operation of answer bridge relay 310, relay 440 now operates in a circuit extending from ground on the master ground conductor MG through operated make contacts 315 on relay 310, break contacts 401 on unoperated relay 1000, and through its upper winding to battery. The operation of relay 440 at this time serves to initiate conversation timing in the connector circuit.

Conversation may now take place between the calling and called parties. Tip and ring conductors T4 and R4 are connected through talking capacitors C31 and C32 to tip and ring brushes TB and RB, respectively.

It is to be noted that in the event that the party should answer before secondary relay 1010 is operated from the pickup ground pulse, answer bridge relay 310 may operate from the called subscriber's loop before the ring trip relay operates. The operating circuit for relay 310 is exactly the same as previously described Responsive to the operation of relay 310, ground is connected through operated make contacts 911 on relay 310, operated make contacts 921 on calling bridge relay 320 and through the lower winding of ring trip relay 1130 to battery. Thus the ring trip relay may be operated, without ringing of the called party, to disconnect the ring back tone and perform the various previously described operations.

When the calling party releases at the termination of the conversation, calling bridge relay 320 releases when the loop is opened. At contacts 922, relay 320 opens the operating circuit for release delay relay 900 which also releases. At contacts 304, relay 900 removes ground from the sleeve conductor S4 to release the switch through relay of the line finder and the cut-off relay of the line circuit and relay 210 in the connector circuit. At contacts 814, relay 210 removes ground from the master ground conductor MG to release the switch through relay 1210, the ring trip relay 1130, the trunk hunt relay 440, and the second digit adding relay 1730. Responsive to the release of relays 210 and 1210, the release magnet M153 is energized over a circuit extending from ground on the release alarm conductor of Fig. 13, through break contacts 1313 on unoperated relay 210, break contacts 1303 on relay 800, break contacts 1711 on unoperated relay 1210, primary off-normal contacts 151, and/or secondary off-normal contacts 152, and through its winding to battery. The operated release magnet serves to restore the switch brushes to the normal position. The ringing selecting switch release magnet is also operated from the same release alarm ground and through the ringing selecting switch off-normal contacts R. S. ON121 and through its winding to battery. Thus the switch is restored to normal.

*Called line busy*

If the called line is busy, busy test relay 1140 operates when the party delay relay 1020 releases at the termination of the impulses of the ringing digit. The busy test relay operates over a circuit extending from ground on the sleeve brush SB through break contacts 442 on relay 440, break contacts 205 on unoperated relay 800, operated make contacts 215 on relay 210, break contacts 421 on unoperated relay 1020, operated make contacts 932 on relay 930 and through its upper inductive and its lower non-inductive windings, in parallel, to battery. Slow release relay 930, which is deenergized when party delay relay 1020 releases, finally releases and completes a locking circuit for relay 1140. The locking circuit extends from ground on operated make contacts 901 on relay 900, through operated make contacts 1141 on relay 1140, break contacts 931 on now released relay 930, and through the windings of relay 1140 to battery.

Responsive to the operation of the busy test relay 1140 and the release of trunk hunting delay relay 930, the upper winding of reverting call relay 520 is connected in series with the sleeve conductor S4 for the purpose of determining whether the call is a call to a busy line or a reverting call. Contacts 544 on relay 1140 and contacts 333 on relay 930 remove the short circuit from the upper winding of relay 520. Since this is assumed to be a call to a busy line, relay 520 will now operate from ground on operated contacts 304 on relay 900 and through its upper winding, over the sleeve conductor S4 to battery through the winding of the switch through relay in the finder (not shown) and battery through the winding of the cut-off relay in the line circuit (not shown).

60 I. P. M. battery through the upper non-inductive winding of relay 800, break contacts 436 on unoperated relay 1530, operated make contacts 522 on relay 520, break contacts 317 on unoperated relay 310, break contacts 334 on unoperated relay 930, and break contacts 343 on unoperated relay 940 is now connected to the hunt sleeve conductor HS4. This battery flash has no function on a call from a local subscriber. Busy tone of Fig. 6 is now connected through break contacts 331 on unoperated relay 930, break contacts 434 on unoperated relay 1530, operated make contacts 542 on relay 1140, break contacts 613 on unoperated relay 1210, the upper winding of answer bridge relay 310, and through the talking capacitor C31 to the tip conductor T4 and thus to the calling subscriber.

When the calling party restores his handset, the circuits are released as before.

*P. B. X trunk hunting*

If a trunk line in a group of P. B. X trunk lines is selected by the secondary operation of the switch in response to the units digit, release of relay 1020 at the termination of the ringing digit will initiate trunk hunting if the selected trunk line is busy. Busy test relay 1140 operates over the sleeve brush SB as previously described. The ground on the busy sleeve terminal is connected to the corresponding HS terminal in the connector banks by a connection utilized to identify a trunk line in a P. B. X group. This bank strapping is shown in Fig. 7. The hunt assist relay 1600 now operates from ground on the hunt sleeve brush HSB, through operated make contacts 546 on relay 1140, break contacts 1542 on unoperated relay 440, overflow contacts OF161, the secondary interrupter contacts SEC. INT.162, primary interrupter contacts PRI. INT.171, ringing selecting switch interrupter contacts R. S. INT.123, break contacts 1215 on unoperated relay 1210, still operated make contacts 933 on trunk hunting delay relay 930, and through the windings of relay 1600 to battery. At its operated contacts 1102, relay 1600 connects ground through break contacts 1024 on unoperated relay 1020 and through the secondary magnet M152 to battery. The same ground is also connected through break contacts 1022 of unoperated relay 1020 and through the winding of trunk hunting delay relay 930. Operated contacts 1101 also connect the locking ground through the various interrupter contacts in series to insure the complete operation of the secondary magnet as previously described. The hunt assist relay 1600 continues to function in conjunction with the busy test relay 1140 to step the secondary magnet M152 and hold the trunk hunting delay relay 930 operated until an idle trunk line is found. When an idle trunk line is found, relays 1140 and 1600 do not operate. When relay 930 releases, the switch through relay 1210 operates and the succeeding operations are identical to those described above when an ordinary subscriber line is seized.

If all lines of the P. B. X group are busy, the hunt assist relay 1600 is prevented from operating by the absence of a strap connection between the S and HS terminals of the last line of the P. B. X group. When trunk hunt delay relay 930 releases, busy test relay 1140 locks operated and busy tone and flash are connected to the calling terminals as previously described.

*Permanent timing*

Timing becomes effective in the connector circuit as soon as the connector circuit is seized. If the subscriber on the called line does not answer within two to four minutes after the connector circuit is first seized, the connector and the preceding switches are released and the line circuit is placed in the lockout condition. When relay 210 operates upon seizure of the connector circuit, the timing pulse one lead, shown in Fig. 8, is connected to the upper winding of timing relay 1110 over a path extending from timing pulse one conductor through operated make contacts 815 on relay 210, break contacts 1002 on unoperated relay 1000, break contacts 1113 on unoperated relay 1110, break contacts 1134 on unoperated relay 1130, and through the upper winding of relay 1110 to battery. A ground pulse of short duration appears on the timing pulse one lead every two minutes. Whenever the first pulse appears, timing relay 1110 operates.

Timing relay 1110, upon operating, closes a locking circuit for its upper winding from master ground on conductor MG through its operated make contacts 1114, break contacts 1134 on unoperated relay 1130, and through its upper winding to battery. As previously mentioned, the operating ground for release delay relay 900, through operated make contacts 922 on calling bridge relay 320, is derived from break contacts Z141 on release magnet M153 and through break contacts 1118 on timing relay 1110 before relay 1110 is operated. The operation of relay 1110 opens this original circuit at break contacts 1118 and substitutes a ground from the interrupter machine on conductor hold two at its operated make contacts 1119. The hold two ground is interrupted by the interrupter machine two minutes after the application of ground to the timing pulse one lead. When the ground is removed from the hold two conductor, release delay relay 900 releases to remove ground from the sleeve conductor S4 and thus initiate the release of the preceding circuits and of the connector circuit as previously described. The line circuit, responsive to the removal of ground from the sleeve conductor, will be placed in the lockout condition in the well known manner.

If the call is answered before the permanent timing period has expired, timing relay 1110 is released when ring trip relay 1130 operates. Relay 1130 has differentially connected windings for the purpose of forcing its release at this time since the relay is reused for conversation timing when optional wiring G is connected between terminals A124 and A125 of Fig. 12. The operation of relay 1130 opens the energizing circuit of the upper winding of relay 1110 at break contacts 1134. However, since timing relay 1110 is still operated, a circuit is now completed for its lower winding. The circuit extends from master ground on conductor MG through operated make contacts 1114 on relay 1110, now operated make contacts 1133 on relay 1130, break contacts 1125 on unoperated relay 520, through the optional wiring G, operated make contacts 1043 on relay 440, and through its lower winding to battery. Since relay 1110 is differentially connected, the flux in the relay must necessarily pass through zero and the relay releases. Thus, any time elapsed during the permanent timing period will not be deducted from the conversation timing period.

*Conversation timing*

The first ground pulse appearing on the timing pulse one lead after the call has been answered will operate timing relay 1110. The operating circuit extends from the timing pulse one conductor through operated make contacts 815 on relay 210, break contacts 1002 on relay 1000, break contacts 1113 on unoperated relay 1110, operated make contacts 1133 on relay 1130, break contacts 1125 on unoperated relay 520, through strap G, operated make contacts 1043 on relay 440, and through the lower winding of relay 1110 to battery. Timing relay 1110, upon operating, opens this original energizing circuit at its break contacts 1113 and closes the previously described holding circuit at its operated make contacts 1114.

A ground pulse appearing on the timing pulse two conductor, approximately two minutes after the appearance of a ground pulse on the timing pulse one conductor, operates relay 520 over a circuit extending from the timing pulse two conductor, operated make contacts 813 on relay 210, operated make contacts 1112 on relay 1110, break contacts 1142 on unoperated relay 1140, break contacts 1123 on unoperated relay 520, and through the lower winding of relay 520 to battery. Relay 520 closes a locking circuit for its lower winding from master ground on conductor MG, through its preliminary make contact 1124 and through its lower winding to battery. At its operated contacts 1125, relay 520 disconnects the original holding path for timing relay 1110 and at its operated make contacts 1126 closes a substitute holding circuit through operated make contacts 1115 on relay 1110 to the hold one conductor. Ground is removed from the hold one conductor approximately two minutes after the ground pulse appears on the timing pulse two conductor. The removal of ground from the hold one conductor causes the release of timing relay 1110. It can be seen than the operating ground for release delay relay 900 through operated make contacts 922 on calling bridge relay 320 was derived through operated make contacts 1045 on relay 440, which operated when the call was answered, and through operated contacts 1117 on relay 1110 from break contacts Z141 on release magnet M153. The release of timing relay 1110 disconnects this ground at its contacts 1117 and substitutes ground on the hold two conductor through operated make contacts 1128 on relay 520 and through its break contacts 1116. This hold two ground is interrupted by the interrupter machine approximately two minutes after the interruption of the ground on the hold one conductor. The release of timing relay 1110 also completes the circuit from the conversation warning tone pulse conductor to the reversing relay 1200. A ground pulse appears on this conductor in one minute intervals so that two pulses are received before the hold two ground is interrupted. Relay 1200 operates over a circuit extending from the ground pulse on the conversation warning tone pulse conductor through break contacts 1111 on unoperated relay 1110, operated make contacts 1121 on relay 520, operated make contacts 1211 on switch through relay 1210, and through its winding to battery. The momentary operation of relay 1200 serves to connect a warning tone to the calling and called subscribers over a circuit extending from the warning tone conductor of Fig. 6 through capacitor C62, operated make contacts 603 on relay 1200, operated make contacts 441 on relay 440, operated make contacts 612 on relay 1210 to the ring conductor through capacitor C32 to the calling party and over ring brush RB to the called party. When the hold two ground is removed, release delay relay 900 releases to remove ground from the sleeve conductor S4 to release the preceding equipment and initiate the release of the connector circuit.

*Reverting call*

When a calling party dials the directory number of another subscriber on the same line circuit, the line will, of course, test busy. Busy test relay 1140 operates and locks, as previously described under a call to a busy line. It will be remembered that a call to a busy line was identified as such by the operation of the reverting call relay 520, which is placed in series with the sleeve conductor S4 when the short circuit around its upper winding is removed by the operation of break contacts 544 on busy test relay 1140 and the release of make contacts 333 on the trunk hunting delay relay 930. Since this is a reverting call, ground applied to the sleeve brush SB is connected to the sleeve conductor S4 at the line circuit and thus prevents the operation of the reverting call relay 520 by maintaining a ground shunt on its operating winding. The ground for the sleeve brush SB is derived from operated make contacts 306 on relay 900 through break contacts 524 on the unoperated reverting call relay 520, the upper winding of switch through relay 1210, break contacts 438 on relay 1530, break contacts 332 on unoperated relay 930, break contacts 421 on unoperated relay 1020, operated make contacts 215 on relay 210, break contacts 205 on unoperated relay 800, break contacts 442 on unoperated relay 440 to the sleeve brush SB.

Busy tone is, of course, connected to to the calling party through operated make contacts on the busy test relay 1140 and break contacts on the unoperated trunk hunting delay relay 930 as previously described on a call to a busy line. In response to the busy tone, the calling party will restore his handset to release calling bridge relay 320 and release delay relay 900. When release delay relay 900 releases, the previously described ground through its make contacts 306 to the sleeve brush SB is replaced with a ground through its break contacts 305 and through break contacts 533 on unoperated relay 1130, break contacts 806 on unoperated relay 800, break contacts 1044 on unoperated relay 440, break contacts 1118 on unoperated relay 1110, and through break contacts Z141 on release magnet 153. The reverting call delay relay does not release at this time since the ground on the sleeve brush SB is connected to the sleeve conductor S4 at the line circuit and is further connected through operated make contacts 811 on relay 210, break contacts 801 on unoperated relay 800, and through the lower winding of relay 210 to battery.

The locking circuit for the busy test relay 1140 is opened by the release of relay 900 at contacts 901. The busy test relay 1140 thus releases. Switch through relay 1210 now operates over its upper winding in series with the sleeve brush SB and the cut-off relay (not shown) of the line circuit to battery. Ringing of the called party now takes place in the same manner as previously described on a call to an idle line.

When the called party answers, or if the calling party should answer, ring trip relay 1130 operates as previously described over the called line loop circuit. When ring trip relay 1130 operates, it opens the connection of ground to the front sleeve at its operated contacts 533. Thus the reverting call delay relay 210 is released to initiate the complete release of the connector circuit, the switch through relay (not shown) in line finder 40 is released to initiate the release of the line finder switch and the line circuit is placed in the lock out condition.

*Permanent timing on reverting calls*

If a reverting call is not answered within two to four minutes after seizure of the connector circuit, the connector circuit and preceding circuits will be released. In the preceding section, which dealt with reverting calls, it was pointed out that ground for the sleeve brush SB was derived from ground on the break contacts Z141 on release magnet M153 and through break contacts 1118 on timing relay 1110. When the timing relay 1110 operates from a ground pulse on the timing pulse one conductor, as previously described, the Z141 ground is replaced with ground on the hold two conductor through operated make contacts 1119 on timing relay 1110. When the hold two ground is interrupted, reverting call delay relay 210 releases to initiate the release of the connector circuit.

*Restricted service*

Subscriber lines which are restricted to certain calling subscriber lines are terminated in a portion of the bank terminals in levels having RS wiring on the XX bank terminals. Calling subscriber lines which are to be restricted are marked by ground on their HS terminal in the finder banks, as shown in Fig. 1.

Assume that the calling subscriber has seized a connector circuit and dialed the unlocking level, the tens, units, and ringing digit of the called subscriber line all exactly as described under the section entitled "Called Line Idle."

At the completion of the dialing of the ringing digit, party delay relay 1020 releases. At contacts 1021 relay 1020 opens the operating circuit of hunting delay relay 930. During the release time of relay 930, reversing relay 1200 operates over a circuit extending from ground on the HS1 terminal of the finder banks shown in Fig. 1, finder brush FHS, the hunt sleeve conductor HS4, break contacts 343 on unoperated relay 940, still operated make contacts 335 on relay 930, break contacts 402 on unoperated relay 1000, break contacts 422 on relay 1020, break contacts 1212 on unoperated relay 1210, and through its winding to battery.

Responsive to the operation of the reversing relay 1200, hunt assist relay 1600 operates pulse assist with the secondary magnet M152 to drive the switch to overflow in its secondary direction. The operating circuit for relay 1600 is as follows: master ground on conductor MG, through break contacts 341 on unoperated relay 940, over the XX brush XXB, through RS wiring, operated make contacts 1701 on reversing relay 1200, overflow contacts OF161, secondary interrupter contacts SEC. INT.162, primary interrupter contacts PRI. INT.171, ringing selecting switch interrupter contacts R. S. INT.123, break contacts 1215 on unoperated relay 1210, operated make contacts 933 on relay 930, and through the winding of relay 1600 to battery. At its operated make contacts 1102, relay 1600 closes ground through break contacts 1024 on unoperated relay 1020 to the secondary magnet M152. The ground is also extended through break contacts 1022 on unoperated relay 1020 and through the winding of relay 930 to battery. Thus the secondary magnet operates to advance the switch wipers and the trunk hunting delay relay 930 is held operated. The operating circuit for hunt assist relay 1600 is opened when contacts SEC. INT.162 open upon complete operation of the secondary magnet. Relay 1600 releases to release the secondary magnet and thus reclose the SEC. INT.162 contacts. This operation is repeated until the switch brushes reach the overflow position and contacts OF161 open.

Responsive to the driving of the brushes to the overflow position, relay 520 operates over a circuit extending from ground on the master ground conductor MG through operated make overflow contacts OF101 and through its winding to battery. Busy tone is connected to the calling party over a circuit extending from the busy tone conductor of Fig. 6, through operated make overflow contacts OF42, operated make contacts 213 on relay 210, the upper winding of calling bridge relay 320 to the tip conductor T4 and thus to the calling party. 60 I. P. M. battery on the 60 I. P. M. conductor of Fig. 8, through the upper non-inductive winding of relay 800, break contacts 436 on unoperated relay 1530, is now connected through operated make contacts 522 on relay 520, break contacts 317 on unoperated relay 310, break contacts 334 on unoperated relay 930, break contacts 343 on unoperated relay 940, to the hunt sleeve conductor HS4.

When the calling party releases, the circuits will be released in the same manner as previously described.

*Call to trunk line terminating in a distant office*

Trunk circuits which connect to trunk lines extending to a distant office terminate in levels of the switch banks which have M or RS wiring connected to their XX bank contacts. In Fig. 7, M wiring is shown connected to level zero, and RS wiring is shown connected to level nine. In practice, level zero is usually used for toll service and level nine might be used for free service trunk line connections to another automatic exchange. The free service connections are usually restricted to a certain class of subscriber lines in the community dial office.

Assume that a non-restricted subscriber line initiates a call and seizes the connector circuit. Calling bridge relay 320, release delay relay 900, reverting call delay relay 210, primary delay relay 940, secondary delay relay 1010, party delay relay 1020, and trunk hunting delay relay 930 operate as previously described under the section entitled "Called Line Idle."

Assume that the calling subscriber dials the digit "9" for connection to a trunk line terminating in a distant office. In response to the interruption of the loop circuit by the dial springs, calling bridge relay pulses and repeats the impulses to the hunt assist relay 1600. Relay 1600, in turn, repeats the impulses to the primary magnet M151 which advances the brushes off-normal in the primary direction. At the termination of the impulses, the brushes are positioned before the ninth level in the switch banks and the primary delay relay 940 releases.

Responsive to the release of relay 940, ground on the master ground conductor MG is connected through break contacts 341 on unoperated relay 940, the XX brush XXB, RS wiring, break contacts 1702 on unoperated relay 1200, break contacts 1736 on unoperated relay 1730, operated make contacts 336 on relay 930, operated make contacts 216 on relay 210, and through the upper winding of the trunk hunt relay 440 to battery. At its now opened contacts 1042, relay 440 opens the energizing circuit for the upper winding of the party delay relay 1020, which relay now releases.

Figure 10:
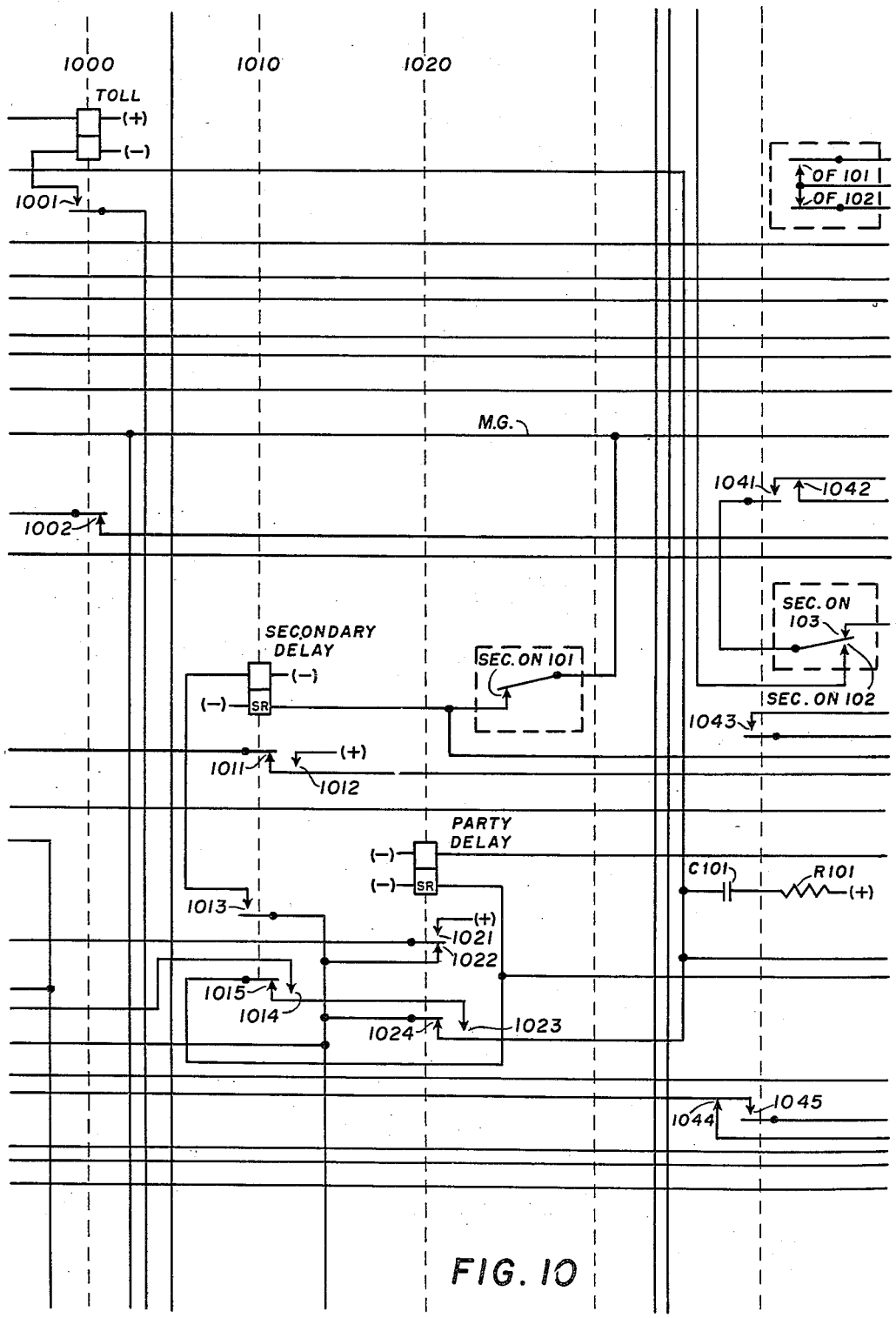
Figure 11:
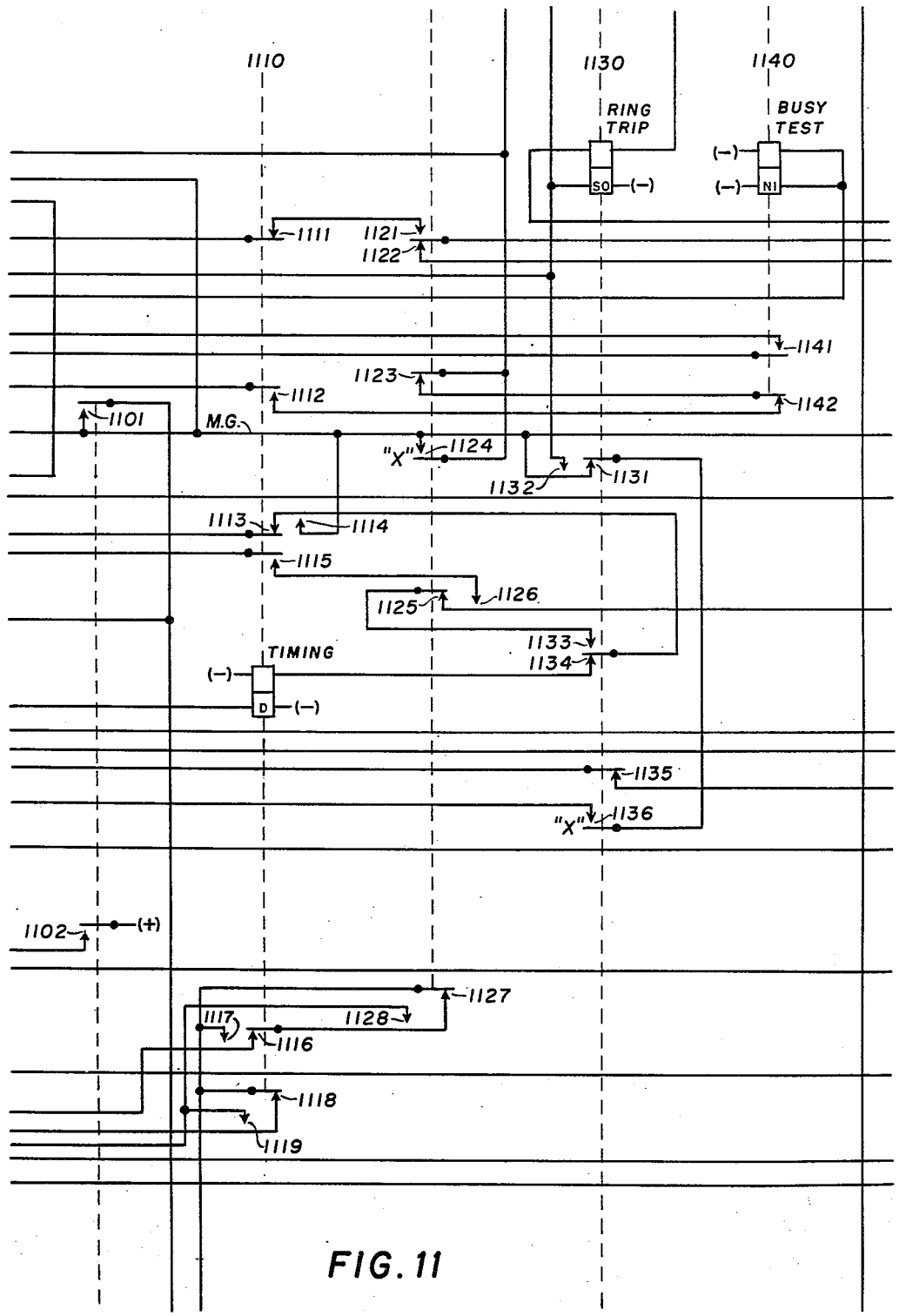

Relay 1600 is now operated responsive to the operation of relay 440 over a circuit extending from ground on the master ground conductor MG, through break contacts OF102 of Fig. 10, operated make contacts 1041 on relay 440, break contacts SEC. ON103, break contacts SEC. INT.162, break contacts PRI. INT.171, break contacts R. S. INT.123, break contacts 1215 on unoperated relay 1210, operated make contacts 933 on relay 930, the windings of relay 1600, and through break contacts Z153 on release magnet M153 to battery. At contacts 1102, relay 1600 closes ground through break contacts 1024 on unoperated relay 1020, and through the secondary magnet M152 to battery. This circuit also extends through break contacts 1022 on unoperated relay 1020 to maintain trunk hunting delay relay 930 operated.

The secondary magnet operates to advance the brushes one step in the secondary direction. This operation opens the break contacts SEC. ON103 to open the previously described operating circuit for the hunt assist relay 1600.

Assume that the first trunk line of the trunk line group is busy. Busy trunk lines are marked by ground on the sleeve conductor of the associated trunk circuit and idle trunk lines are marked by the absence of ground on the sleeve terminal of the associated trunk circuit. Ground on the sleeve terminal of the first trunk circuit is connected over the sleeve brush SB, through operated contacts 443 on relay 440, break contacts 1302 on unoperated relay 800, to a terminal of the lower winding of the cut through relay 800. The other terminal of the lower winding of cut through relay 800 is connected to ground on sleeve conductor S4. Thus the operating winding of relay 800 is shunted with ground on either side of its operating winding. The ground on the sleeve bank terminal is connected through the strap, which is connected between the S and HS terminals of each trunk circuit in a trunk line group, to the HS terminal, over the hunt sleeve brush HSB, break contacts 545 on unoperated relay 1140, operated make contacts 1541 on relay 440, break contacts OF161, and through the various interrupter contacts as previously described, to the windings of hunt assist relay 1600.

Hunt assist relay 1600 operates to again operate the secondary magnet M152 and thus advance the switch brushes to the next trunk circuit of the group. This action will continue until an idle trunk circuit, marked by absence of ground on the sleeve bank terminal, is found. When an idle trunk circuit is found, cut through relay 800 operates in series with hunt assist relay 1600 over a circuit extending from ground on sleeve conductor S4, through the inductive winding of cut through relay 800, break contacts 1302 on unoperated relay 800, operated make contacts 443 on relay 440, sleeve brush SB, the strap between the sleeve bank terminal and the hunt sleeve bank terminal, hunt sleeve brush HSB, break contacts 545 on unoperated relay 1140, operated make contacts 1541 on relay 440, break contacts OF161, and through the various series connected magnet interrupter contacts, and through the windings of the hunt assist relay 1600 to battery.

Relay 800 operates in this circuit but there is not sufficient current flow for the operation of the hunt assist relay 1600. At its operated make contacts 1301, cut through relay 800 locks operated through the windings of the hunt assist relay 1600 to battery exclusive of the control brushes and external bank wiring. At its contacts 803, relay 800 disconnects ground from the master ground conductor to release relay 440. At its contacts 201, 202, and 203, 204, relay 800 disconnects the calling bridge relay 320 of the connector circuit and connects the calling loop to the tip and ring brushes TB and RB, respectively. This loop closure to the trunk circuit results in the seizure of the trunk circuit and the returning of ground potential over the sleeve brush SB. In the connector circuit the release of calling bridge relay 320 results in the release of the release delay relay 900 to remove ground from the sleeve conductor S4 in the connector circuit. Release delay relay 900 has sufficient release time to cover the operate time of the calling bridge relay and release delay relay of the seized trunk circuit. Thus, ground is applied to the sleeve brush SB before ground is removed from the sleeve conductor S4 at contacts 304 of relay 900. Ground on sleeve brush SB, returned from the trunk circuit, is connected through break contacts 442 on unoperated relay 440 and through operated contacts 206 on relay 800 to the sleeve conductor S4 to maintain the cut through relay 800 and the preceding circuits operated.

When the call is released, ground is removed from the sleeve brush SB by the trunk circuit to release cut through relay 800, the switch through relay in the finder circuit, and the cut-off relay of the line circuit. Release of cut through relay 800 in the connector circuit connects the release alarm ground through its break contacts 1303 to operate the release magnet M153 and restore the switch to normal, as previously described.

If all trunk lines in the trunk line group are busy, hunt assist relay 1600 functions pulse assist with the secondary magnet M152 to drive the switch brushes onto the vacant terminal which immediately succeeds the last trunk line of the trunk line group. Even though there is no ground on the sleeve bank terminal to shunt the cut through relay 800, relay 800 cannot operate in series with relay 1600 because of the absence of a strap between the sleeve and hunt sleeve terminals of that position. Busy tone is now connected to the calling line over a circuit extending from the busy tone conductor of Fig. 6 through operated PRI. ON62 contacts, break contacts 631 on unoperated relay 1730, break contacts 621 on unoperated relay 1720, break contacts 433 on unoperated relay 1530, break contacts OF41, operated make contacts 213 on relay 210, the upper winding of calling bridge relay 320 to the tip conductor T4 of the calling line.

When the calling party restores his handset, the circuits are released, as previously described.

Figure 17:
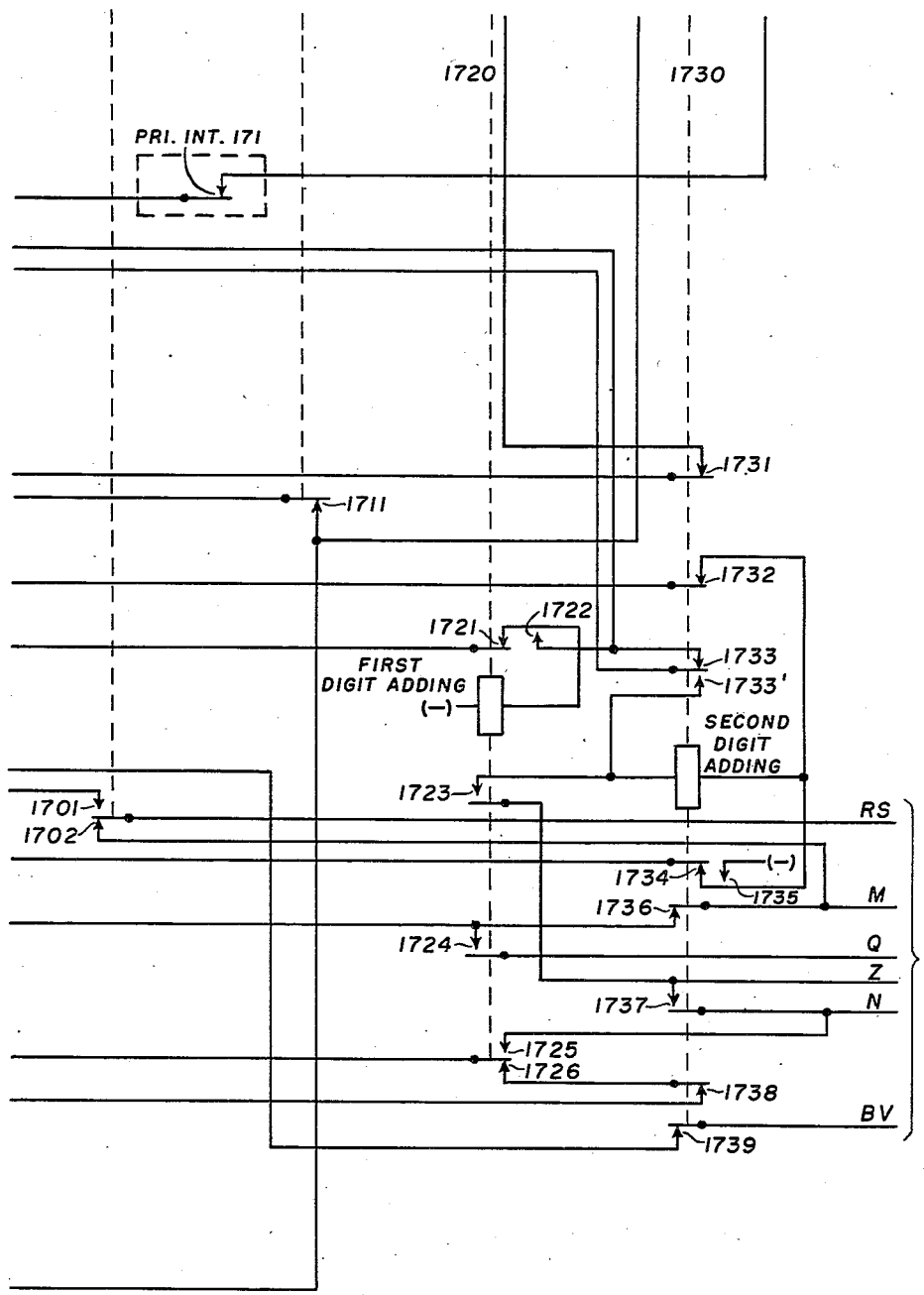

It can be seen that if an M wiring level is selected, the connector will function in exactly the same manner as that just described since RS wiring is connected through break contacts 1702 on unoperated relay 1200 to M wiring in Fig. 17.

Restricted service

Trunk lines which are to be restricted to certain calling subscriber lines have their associated trunk circuits terminated in levels which have RS wiring on their XX bank contact. Calling subscriber lines which are restricted are identified by ground strapping on the HS terminal in the finder banks, as shown in Fig. 1.

Assume that a restricted subscriber line has seized the connector and the digit "9" has been dialed. When primary delay relay 940 releases at the termination of the digit, master ground connected through break contacts 341 of relay 940, over the XX brush XXB, and over the RS wiring, operates trunk hunt relay 440, as previously described. Reversing relay 1200 is now operated over a circuit extending from ground on the HS1 bank terminal of the finder banks, finder hunt sleeve brush FHS, hunt sleeve conductor HS4, break contacts 343 on unoperated relay 940, operated make contacts 335 on relay 930, break contacts 402 on unoperated relay 1000, operated make contacts 444 on trunk hunt relay 440, break contacts 1212 on unoperated relay 1210, and through its winding to battery.

At its operated contacts 1701, reversing relay 1200 connects the grounded RS conductor through break contacts OF161 and through the various interrupter contacts of the switch magnets, as previously described, to operate the hunt assist relay 1600. Relay 1600 now functions pulse assist with the secondary magnet M152 to drive the switch to overflow. When the overflow position is reached, break contacts OF161 open to prevent further stepping of relay 1600 and secondary magnet M152.

Busy tone is connected to the calling line over a circuit extending from the busy tone conductor of Fig. 6 through now operated overflow contacts OF42, operated make contacts 213 on relay 210, the upper winding of calling bridge relay 320 to the tip conductor T4 and thus to the calling line.

When the calling party restores his handset, the circuits are released in the same manner as previously described.

Digit adding, digit canceling

This section of the specification is devoted to a description of the various level wiring which has not been previously described. It will be remembered that Z and V wiring was described in the section "Called Line Idle." This wiring serves to unlock the connector circuit so that the switch is directively controlled in its secondary operation. The dialing of an unlocking level results in the operation and locking of the second digit adding relay 1730. RS wiring has been previously described both as to the automatic advancement of the brushes when dialed before an unlocking level is dialed, and directive control after an unlocking level is dialed. This operation has been previously described on calls from both restricted and non-restricted subscriber lines. The other optional wirings will now be described.

N and W wiring

This wiring is used on a level requiring digit adding when dialed as a first digit. When the primary delay relay 940 releases at the termination of the impulses of the first digit, relay 1720 operates.

The operating circuit for the first digit adding relay 1720 extends from W wiring ground on the fourth contact of the X bank, shown in Fig. 7, over X brush XB, break contacts 1731 on unoperated relay 1730, operated make contacts 1521 on relay 1020, break contacts 1442 on now released relay 940, break contacts 1721 on unoperated relay 1720, and through its winding to battery. Relay 1720 closes a locking circuit for itself through its operated make contacts 1722, break contacts 1733 on unoperated relay 1730, and through operated make contacts 304 on relay 900 to ground.

The release magnet M153 now operates over a circuit extending from ground on the master ground conductor MG, through break contacts 341 on unoperated relay 940, the XX brush XXB, N wiring, operated make contacts 1725 on relay 1720, operated make contacts 1312 on relay 210, break contacts 1303 on unoperated relay 800, break contacts 1711 on unoperated relay 1210, operated make contacts PRI. ON151, and through its winding to battery. The release magnet, upon operating, restores the switch brushes to the normal position. Dial tone is not reconnected to the calling line since the dial tone path is opened at break contacts 621 of relay 1720. Operated make contacts 622 of relay 1720 supply ground for the upper winding of the calling bridge relay 320.

If the level is dialed after the added digit has been dialed, as characterized by the operated first digit adding relay 1720, the release magnet M153 is operated from ground on the XX brush over N wiring and the previously described path. Thus the switch brushes are restored to normal each time the level having N and W wiring is dialed after the dialing of the digit adding level.

If the level having N and W wiring is dialed after the dialing of an unlocking level, which is characterized by the operated relay 1730, relay 1720 cannot operate from W wiring ground since break contacts 1731 on operated relay 1730 hold open the previously described operating circuit. Ground on N wiring is ineffective at this time since relay 1720 is not operated. The switch must be controlled by directive impulses to advance in its secondary direction.

N wiring

This wiring is used on levels requiring busy tone if dialed before added digit. It can be seen that ground connected through the XX brush XXB at the termination of the primary digit to N wiring will have no effect since make contacts 1737 on relay 1730 and make contacts 1725 on relay 1720 are not operated. Busy tone is returned to the calling party over a circuit extending from the busy tone conductor of Fig. 6 through operated make PRI. ON62 contacts, break contacts 631 on unoperated relay 1730, break contacts 621 on unoperated relay 1720, break contacts 433 on unoperated relay 1530, break contacts OF41, operated make contacts 213 on relay 210, the upper winding of relay 320 to the tip conductor T4. Further digits dialed by the calling subscriber will be of no effect. It will be remembered that the pulsing ground through break contacts 923 on calling bridge relay 320 must be connected through operated contacts 1231 of the second digit adding relay to operate the hunt assist relay after release of the primary delay relay 940. Relay 940 shunts contacts 1231 at its own operated contacts 943 so that the primary directing digit is effective in the connector circuit.

If N wiring is dialed after digit adding, characterized by operated first digit adding relay 1720, the release magnet M153 is operated through operated contacts 1725 on relay 1720 and the remainder of the previously described path.

If an N wiring level is dialed after an unlocking level is dialed, characterized by operated second digit adding relay 1730, the switch must be directively controlled in its secondary direction.

Q wiring

This wiring is used on a level requiring busy tone if dialed before added digit. It can be seen that ground on Q wiring will be of no effect since make contacts 1724 on relay 1720 are not operated. Busy tone is connected to the calling party over the previously described path. Succeeding digits dialed by the calling subscriber will be of no effect because of the unoperated make contacts 1231 in the operating circuit of hunt assist relay 1600, as previously explained.

If a Q wiring level is dialed after an added digit, as characterized by operated relay 1720, the switch will automatically trunk hunt and switch through. The ground on Q wiring is connected through operated make contacts 1724 on relay 1720 to M wiring which results in the operation of trunk hunting relay 440, as previously described under section entitled "Call to Trunk Line Terminating in Distant Office."

If Q wiring is dialed after an unlocking digit, the switch must be directively controlled for secondary advancement of the brushes.

Z wiring

This wiring is used on levels requiring busy tone if dialed before added digit. Ground on Z wiring will be of no effect because if the unoperated make contacts 1737 on relay 1730 and 1723 on relay 1720. Busy tone is returned to the calling party over the path described under "N Wiring." Further digits dialed by the calling party will be of no effect since the make contacts 1231 on relay 1730 are not operated, as previously explained. If Z wiring is dialed after a digit adding level is dialed, characterized by the operated relay 1720, relay 1730 operates from ground on Z wiring through operated make contacts 1723 on relay 1720, the winding of relay 1730, break contacts 1734 on relay 1730, and through break contacts Z153 on release magnet M153. Relay 1730 closes a ground locking circuit for its winding through its operated make contacts 1733 and through operated make contacts 304 on relay 900. At its operated contacts 1735, relay 1730 connects a battery locking circuit for its winding. The ground on Z wiring is now connected through operated make contacts 1737 on relay 1730 and through operated make contacts 1725 on relay 1720 and over the previously described circuit to operate the release magnet M153. The operated release magnet restores the switch brushes to normal. Responsive to the restoration of the brushes to normal, primary delay relay 940 operates from ground on the master ground conductor MG through break contacts PRI. ON91 and through its upper winding to battery. At its operated contacts 1441, relay 940 opens the holding circuit for relay 1720 which then releases. The switch banks are now unlocked since relay 1730 is locked operated and the the switch must be controlled by directive impulses to advance in its secondary direction.

BV wiring

The busy verification feature is described in the section of this specification entitled "Busy Verification From Toll." If BV wiring level is dialed after unlocking, the switch must be controlled by directive impulses for advancement of its brushes in a secondary direction.

Call from toll to local subscriber

A call from the distant toll office to the community dial office is routed through a trunk circuit, such as trunk circuit 30 of Fig. 1. When seized over the trunk line 35, which extends to the distant office, trunk circuit 30 closes a loop circuit to toll line circuit 20 over the trunk tip and trunk ring conductors TT and TR in the well known manner. Line circuit 20 and line finder 40 then function to connect the trunk circuit to the connector circuit. Calls from toll are characterized by resistance battery forwarded over the hunt sleeve conductor during the impulsing of each digit.

During the impulsing of each digit, shunt relay 110 in trunk circuit 30 operates in the well known manner and functions to connect battery potential to the trunk hunt sleeve conductor THS. In the connector circuit, toll relay 1000 operates over a circuit extending from battery through resistor R11 in trunk circuit 30, operated make contacts 111 on shunt relay 110, trunk hunt sleeve conductor THS, hunt sleeve conductor HS2, finder hunt sleeve bush FHS, hunt sleeve conductor HS4, operated make contacts 344 on primary delay relay 940, and through its upper winding to ground.

Operated toll relay 1000 closes a locking circuit for its secondary winding from ground on operated make contacts 304 on relay 900, through operated contacts 1001 on relay 1000, and through its lower winding to battery. The operation of toll relay 1000 alters the operation of the connector circuit so that the permanent timing and conversation timing features will not function on a toll call. At its operated contacts 1002, relay 1000 opens the timing pulse one conductor so that permanent timing will be disabled. At its operated contacts 401, toll relay 1000 opens an operating circuit to relay 440 so that this relay will not be operated in response to the operation of the answer bridge relay 310 when the called party answers. This effectively disables the conversation timing feature.

As previously described, the answer bridge relay 310, which operates when the called party answers, connects battery through the non-inductive winding of relay 440 and through its operated contacts 316 to the hunt sleeve conductor HS4. This resistance battery operates the HS supervisory relay 100 in trunk circuit 40 through break contacts 112 on unoperated relay 110. Relay 100, upon operating, transmits a supervisory signal over the trunk line to give the originating operator answer supervision in any well known manner.

Similarly 60 I. P. M. battery, through the non-inductive winding of relay 800 and through operated contacts 522 on relay 520, which operates on a call to a busy line as previously described, flashes the HS supervisory relay 100 at 60 I. P. M. This flash is repeated by relay 100 over the trunk line to the originating operator for busy supervision.

*Busy verification from toll*

A distant office toll operator, wishing to verify the busy condition of a subscriber line in the community dial office, prefixes a particular digit to the directory number of the subscriber line. In the connector circuit, busy verification relay 1530 operates in response to the dialing of the prefix digit. Operated relay 1530 alters the operation of the connector circuit so that answer supervision is returned to the toll operator when the busy line is selected and tip brush TB and ring brush RB are capacitor coupled to tip conductor T4 and ring conductor R4, respectively, to enable the operator to "listen in" on the busy connection. If the called line is idle when dialed, the operated busy verification relay 1530 prevents the operation of the switch through relay 1210 and supervision is not returned to the operator.

Assume that the prefix digit "1" is dialed by the toll operator after seizure of the connector circuit. Toll relay 1000 operates from battery over the hunt sleeve conductor HS during the impulse of the first digit and locks operated on its secondary winding, as previously described. When the primary delay relay 940 releases at the end of the first digit, busy verification relay 1530 operates over a circuit extending from ground on the XX brush XXB over BV wiring through break contacts 1739 on unoperated relay 1730, operated make contacts 1501 on toll relay 1000, the lower winding of relay 1530, break contacts 1732 on unoperated relay 1730, break contacts 1734 on unoperated relay 1730, and through break contacts Z153 on release magnet M153 to battery.

At its operated make contacts 1531, relay 1530 closes a locking circuit for its upper winding from ground on the master ground conductor MG. The release magnet M153 now operates from ground on BV wiring through break contacts 1739 on unoperated relay 1730, operated make contacts 1532 on relay 1530, break contacts 1738 on unoperated relay 1730, break contacts 1725 on unoperated relay 1720, operated make contacts 1312 on relay 210, break contacts 1303 on unoperated relay 800, break contacts 1711 on unoperated relay 1210, operated make contacts PRI, ON151, and through the winding of magnet M153 to battery. The release magnet now restores the brushes to normal, as previously described. Dial tone is not reconnected to the calling line since operated relay 1530 opens the dial tone circuit at its break contacts 433 and connects ground through its operated make contacts 432 to the upper winding of the calling bridge relay 320.

The operator now dials the directory number of the called subscriber and the connector circuit functions exactly as previously described. At the completion of the ringing digit, party delay relay 1020 releases and during the release time of the trunk hunt delay relay 930, a busy test is made, all as previously described.

If the line is busy, the busy test relay 1140 operates from ground on the sleeve brush SB. When trunk hunting delay relay 930 releases, the busy test relay 1140 locks operated as previously described. Reverting call relay 520 is now inserted in the sleeve conductor S4 and operates over its upper winding as previously described.

The HS supervisory relay 100, of trunk circuit 30, now operates over a circuit extending from battery through resistor R41, operated make contacts 437 on relay 1530, operated make contacts 522 on relay 520, break contacts 317 on unoperated relay 310, break contacts 334 on unoperated relay 930, break contacts 343 on unoperated relay 940, the hunt sleeve conductor HS4, finder brush FHS, conductor HS2, conductor THS, break contacts 112 on relay 110, and through its winding to ground. Relay 100, upon operating, repeats the supervision over the trunk line to the originating operator. Busy tone is not connected to the calling line since the busy tone path is held open at operated contacts 434 on busy verification relay 1530. The front tip brush is now connected through operated make contacts 541 on relay 1140, operated make contacts 431 on relay 1530, capacitor C31 to the tip conductor T4. The ring brush RB is now connected through operated make contacts 543 on relay 1140, operated make contacts 435 on relay 1530, capacitor C32 to the ring conductor R4. Thus, the operator may listen in on the busy connection.

If the called line is idle when selected, operated contacts 438 on relay 1530 prevent the operation of the switch through relay 1210.

It can be seen that if a local line should dial BV wiring, busy verification relay 1530 cannot operate because of the unoperated contacts 1501 on toll relay 1000. If a local line should dial the prefix digit, busy tone would be returned to the calling line in the previously described manner.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a two motion step-by-step connector of the drop back type comprising a set of brushes, a terminal bank divided into a plurality of levels, a first predetermined level, first means responsive to directive impulses incoming to said connector for advancing the brushes off-normal in a primary direction to select any level, second means for automatically advancing the brushes in a secondary direction when said first predetermined level is selected in response to a first operation of said first means, a second predetermined level, third means responsive when said second predetermined level is selected in response to a first operation of said first means for restoring said brushes to normal and for controlling said second means to prevent automatic advancement of the brushes in a secondary direction when the first predetermined level is thereafter selected by operation of the first means, and fourth means responsive to directive impulses incoming to said connector subsequent to the selection of the first predetermined level after operation of the third means for advancing the brushes in a secondary direction.

2. In a two motion step-by-step connector of the drop back type comprising a set of brushes, a terminal bank divided into a plurality of levels, a first predetermined level in which a group of trunk lines and subscriber lines terminate, first means responsive to directive impulses incoming to said connector for advancing the brushes off-normal in a primary direction to select any level, second means for automatically advancing the brushes in a secondary direction to select an idle trunk line in said group of trunk lines when said first predetermined level is selected in response to a first operation of said first means, a second predetermined level, third means responsive when said second predetermined level is selected in response to a first operation of said first means for restoring said brushes to normal and for controlling said second means to prevent automatic advancement of the brushes in a secondary direction when the first predetermined level is thereafter selected by operation of the first means, and fourth means responsive to directive impulses incoming to said connector subsequent to the selection of the first predetermined level after operation of the third means for advancing the brushes in a secondary direction to select a particular subscriber line.

3. In a two motion step-by-step connector of the drop back type comprising a set of brushes, a terminal bank divided into a plurality of levels, a first predetermined level in which first and second groups of trunk lines and subscriber lines terminate, first means responsive to directive impulses incoming to said connector for advancing the brushes off-normal in a primary direction to select any level, second means for automatically advancing the brushes in a secondary direction to select an idle trunk line in said first group of trunk lines when said first predetermined level is selected in response to a first operation of said first means, a second predetermined level, third means responsive when said second predetermined level is selected in response to a first operation of said first means for restoring said brushes to normal and for controlling said second means to prevent automatic advancement of the brushes in a secondary direction when the first predetermined level is thereafter selected by operation of the first means, fourth means responsive to directive impulses incoming to said connector subsequent to the selection of the first predetermined level after operation of the third means for advancing the brushes in a secondary direction to select a subscriber line or a trunk line in the second group of trunk lines dependent upon the particular digital value of the directive impulses, and fifth means operative in the event that a busy trunk line in the second group of trunk lines is selected by the operation of the fourth means for automatically further advancing the brushes in a secondary direction to select an idle trunk line in the second group of trunk lines.

4. In a two motion step-by-step connector of the drop back type comprising a set of brushes, a terminal bank divided into a plurality of levels, a first predetermined level in which first and second groups of trunk lines and subscriber lines terminate, first means responsive to directive impulses incoming to said connector for advancing the brushes off-normal in a primary direction to select any level, second means for automatically advancing the brushes in a secondary direction to select an idle trunk line in said first group of trunk lines when said first predetermined level is selected in response to a first operation of said first means, a second predetermined level, third means responsive when said second predetermined level is selected in response to a first operation of said first means for restoring said brushes to normal and for controlling said second means to prevent automatic advancement of the brushes in a secondary direction when the first predetermined level is thereafter selected by operation of the first means, fourth means responsive to directive impulses incoming to said connector subsequent to the selection of the first predetermined level after operation of the third means for advancing the brushes in a secondary direction to select a subscriber line or a trunk line in the second group of trunk lines dependent upon the particular digital value of the directive impulses, a ringing signal selecting switch, fifth means for operating said ringing signal selecting switch in response to directive impulses incoming to said connector subsequent to the operation of the fourth means, sixth means operative in response to the termination of the directive impulses which operate the fifth means in the event that a busy trunk line in the second group of trunk lines is selected by the operation of the fourth means for automatically further advancing the brushes in a secondary direction to select an idle trunk line in the second group of trunk lines, and seventh means for connecting the selected ringing signal to the selected subscriber line or to the selected idle trunk line in the second group of trunk lines.

5. In a telephone system, first and second classes of calling lines, a two motion step-by-step connector comprising a set of brushes, a terminal bank divided into a plurality of levels, a first predetermined level in which a group of trunk lines and subscriber lines terminate, an overflow position in said first predetermined level, means for extending a connection from a calling line of either said first or second class of calling lines to said connector, first means in said connector responsive to directive impulses incoming to said connector from a calling line for advancing the brushes off-normal in a primary direction to select any level, second means in said connector for automatically advancing the brushes in a secondary direction to select an idle trunk line in said group of trunk lines when said first predetermined level is selected in response to a first operation of said first means under control of a calling line of said first class, third means in said connector operated only if the calling line is of said second class for automatically advancing the brushes to said overflow position irrespective of whether there is or is not an idle trunk line in said group of trunk lines when said first predetermined level is selected in response to a first operation of said first means, a second predetermined level, fourth means in said connector responsive when said second predetermined level is selected in response to a first operation of said first means for restoring said brushes to normal and for controlling said second means to prevent automatic advancement of the brushes in a secondary direction when the first predetermined level is thereafter selected by operation of the first means, fifth means in said connector responsive to directive impulses incoming to said connector subsequent to the selection of the first predetermined level by the first means after operation of the fourth means for advancing the brushes in a secondary direction to select a particular subscriber line, and sixth means effective only if the fifth means is operated under control of a calling line of said second class for automatically further advancing the brushes in a secondary direction to said overflow position.

6. In a telephone system, first and second classes of calling lines, a two motion step-by-step connector comprising a set of brushes, a terminal bank divided into a plurality of levels, a first predetermined level in which first and second groups of trunk lines and subscriber lines terminate, an overflow position in said first predetermined level, means for extending a connection from a calling line of either said first or second class of calling lines to said connector, first means in said connector responsive to directive impulses incoming to said connector from a calling line for advancing the brushes off-normal in a primary direction to select any level, second means in said connector for automatically advancing the brushes in a secondary direction to select an idle trunk line in said first group of trunk lines when said first predetermined level is selected in response to a first operation of said first means under control of a calling line of said first class, third means in said connector operated only if the calling line is of said second class for automatically advancing the brushes to said overflow position irrespective of whether there is or is not an idle trunk line in said first group of trunk lines when said first predetermined level is selected in response to a first operation of said first means, a second predetermined level, fourth means in said connector responsive when said second predetermined level is selected in response to a first operation of said first means for restoring said brushes to normal and for controlling said second means to prevent automatic advancement of the brushes in a secondary direction when the first predetermined level is thereafter selected by operation of the first means, fifth means in said connector responsive to directive impulses incoming to said connector subsequent to the selection of the first predetermined level by the first means after operation of the fourth means for advancing the brushes in a secondary direction to select a subscriber line or a trunk line in said second group of trunk lines dependent upon the particular digital value of the directive impulses, sixth means operative in the event that a busy trunk line in the second group of trunk lines is selected by the operation of the fifth means under control of a calling line of said first class for automatically further advancing the brushes in a secondary direction to select an idle trunk line in the second group of trunk lines, and seventh means responsive to the selection of a subscriber line or a trunk line in said second group of trunk lines and effective only if the fifth means is operated under control of a calling line of said second class for automatically further advancing the brushes in a secondary direction to said overflow position.

7. In a telephone system, first and second classes of calling lines, a two motion step-by-step connector comprising a set of brushes, a terminal bank divided into a plurality of levels, a first predetermined level in which first and second groups of trunk lines and subscriber lines terminate, an overflow position in said first predetermined level, means for extending a connection from a calling line of either said first or second class of calling lines to said connector, first means in said connector responsive to directive impulses incoming to said connector from a calling line for advancing the brushes off-normal in a primary direction to select any level, second means in said connector for automatically advancing the brushes in a secondary direction to select an idle trunk line in said first group of trunk lines when said first predetermined level is selected in response to a first operation of said first means under control of a calling line of said first class, third means in said connector operated only if the calling line is of said second class for automatically advancing the brushes to said overflow position irrespective of whether there is or is not an idle trunk line in said first group of trunk lines when said first predetermined level is selected in response to a first operation of said first means, a second predetermined level, fourth means in said connector responsive when said second predetermined level is selected in response to a first operation of said first means for restoring said brushes to normal and for controlling said second means to prevent automatic advancement of the brushes in a secondary direction when the first predetermined level is thereafter selected by operation of the first means, fifth means in said connector responsive to directive impulses incoming to said connector subsequent to the selection of the first predetermined level by the first means after operation of the fourth means for advancing the brushes in a secondary direction to select a subscriber line or a trunk line in said second group of trunk lines dependent upon the particular digital value of the directive impulses, a ringing signal selecting switch, sixth means in said connector for operating said ringing signal selecting switch in response to directive impulses incoming to said connector subsequent to the operation of the fifth means, seventh means in said connector operative in response to the termination of the directive impulses which operate the sixth means in the event that a busy trunk line in the second group of trunk lines is selected by the operation of the fifth means under control of a calling line of said first class for automatically further advancing the brushes in a secondary direction to select an idle trunk line in the second group of trunk lines, eighth means operative in response to the termination of the directive impulses which operate the sixth means only in the event that the calling line is of said second class for automatically further advancing the brushes in a secondary direction to said overflow position, and ninth means in said connector for connecting the selected ringing signal to the selected subscriber line or to the selected idle trunk line in the second group of trunk lines.

8. In a telephone system, a calling line, a two motion step-by-step switch, a set of brushes including a first control brush and a second control brush associated with said switch, a terminal bank having sets of terminals disposed in levels, said sets of terminals including a first control terminal and a second control terminal, a group of trunk lines terminating in successive sets of terminals in a first portion of a predetermined level, said group of trunk lines being identified by a connection from the first control terminal to the second control terminal of the sets of terminals associated with each trunk line of the trunk line group, a vacant set of terminals immediately succeeding the set of terminals which terminates the last trunk line of said trunk line group in said predetermined level, a busy marking potential, means associated with the individual trunk lines for connecting said busy marking potential to said first control terminal when the trunk line is busy, said trunk line being marked as idle by the absence of said potential, means for extending a connection from said calling line to said switch, means responsive to a predetermined value of directive impulses incoming to said switch from said calling line for advancing the brushes in a primary direction to select said predetermined level, means responsive to the selection of the predetermined level for automatically advancing the brushes in a secondary direction so that the first control brush engages the first control terminal and the second control brush engages the second control terminal of the first trunk line in the trunk line group, a first relay in said switch connected to the first control brush, a second relay in said switch connected to the second control brush, means controlled by the operation of said second relay for automatically further advancing the brushes to select an idle trunk line in the event that the first trunk line is busy, said first relay being shunted by said busy marking potential and said second relay operated by said busy marking potential, means controlled by the operation of the first relay for seizing an idle trunk line, said first relay being operated in series with said second relay when an idle trunk line is selected, a busy signaling source, and means responsive to the advancement of the brushes to the vacant set of terminals when all trunk lines in the trunk line group are busy for connecting said busy signaling source to the calling line.

References Cited in the file of this patent
UNITED STATES PATENTS

| Re. 22,475 | McDavitt | May 9, 1944 |
| 2,210,876 | Beale et al. | Aug. 13, 1940 |
| 2,315,010 | Ostline | Mar. 30, 1943 |
| 2,658,949 | Pharis | Nov. 10, 1953 |